United States Patent
Kim et al.

(10) Patent No.: US 10,268,322 B2
(45) Date of Patent: Apr. 23, 2019

(54) METHOD FOR TEMPORARILY MANIPULATING OPERATION OF OBJECT IN ACCORDANCE WITH TOUCH PRESSURE OR TOUCH AREA AND TERMINAL THEREOF

(71) Applicant: HiDeep Inc., Gyeonggi-do (KR)

(72) Inventors: Seyeob Kim, Gyeonggi-do (KR);
Yunjoung Kim, Gyeonggi-do (KR);
Sangsic Yoon, Gyeonggi-do (KR);
Bonkee Kim, Gyeonggi-do (KR);
Hojun Moon, Gyeonggi-do (KR);
Taehoon Kim, Gyeonggi-do (KR);
Sunyoung Kwon, Gyeonggi-do (KR)

(73) Assignee: HiDeep Inc. (KR)

( * ) Notice: Subject to any disclaimer, the term of this patent is extended or adjusted under 35 U.S.C. 154(b) by 0 days.

(21) Appl. No.: 14/666,471

(22) Filed: Mar. 24, 2015

(65) Prior Publication Data
US 2015/0268766 A1  Sep. 24, 2015

(30) Foreign Application Priority Data

Mar. 24, 2014  (KR) .................. 10-2014-0034169
Apr. 22, 2014  (KR) .................. 10-2014-0048336
(Continued)

(51) Int. Cl.
*G06F 3/044* (2006.01)
*G06F 3/0485* (2013.01)
(Continued)

(52) U.S. Cl.
CPC ............ *G06F 3/044* (2013.01); *G06F 3/0485* (2013.01); *G06F 3/0486* (2013.01);
(Continued)

(58) Field of Classification Search
CPC .... G06F 3/044; G06F 3/0488; G06F 3/04847; G06F 3/04845; G06F 3/0486;
(Continued)

(56) References Cited

U.S. PATENT DOCUMENTS

2006/0007182 A1* 1/2006 Sato ...................... G06F 3/0416
                                                    345/173
2006/0022955 A1* 2/2006 Kennedy ............... G06F 3/0414
                                                    345/173
(Continued)

FOREIGN PATENT DOCUMENTS

JP    2006345209    12/2006
JP    2007072233     3/2007
(Continued)

OTHER PUBLICATIONS

Corresponding Office Action issued by the KIPO dated Dec. 29, 2015.
(Continued)

*Primary Examiner* — Liliana Cerullo
(74) *Attorney, Agent, or Firm* — The Belles Group, P.C.

(57) ABSTRACT

A method for temporarily manipulating an operation of an object in accordance with a touch pressure or a touch area may be provided. The method includes: operating the object at a first state; detecting at least one of a magnitude of the touch pressure and a size of the touch area when the touch is input to a touch panel; operating the object at a second state of a first operation according to at least one of the magnitude of the touch pressure and the size of the touch area; and operating the object at the first state when the touch is released.

3 Claims, 23 Drawing Sheets

(30) Foreign Application Priority Data

| May 9, 2014 | (KR) | .................. 10-2014-0055732 |
|---|---|---|
| Aug. 1, 2014 | (KR) | .................. 10-2014-0098917 |
| Sep. 19, 2014 | (KR) | .................. 10-2014-0124920 |
| Oct. 24, 2014 | (KR) | .................. 10-2014-0145022 |
| Dec. 22, 2014 | (KR) | .................. 10-2014-0186352 |

(51) Int. Cl.
- *G06F 3/0486* (2013.01)
- *G06F 3/0484* (2013.01)
- *G06F 3/0488* (2013.01)

(52) U.S. Cl.
CPC ........ *G06F 3/0488* (2013.01); *G06F 3/04845* (2013.01); *G06F 3/04847* (2013.01); *G06F 2203/04101* (2013.01); *G06F 2203/04104* (2013.01); *G06F 2203/04805* (2013.01); *G06F 2203/04806* (2013.01); *G06F 2203/04808* (2013.01)

(58) Field of Classification Search
CPC ......... G06F 3/0485; G06F 2203/04806; G06F 2203/04805; G06F 2203/04101; G06F 2203/04808; G06F 2203/04104
See application file for complete search history.

(56) References Cited

U.S. PATENT DOCUMENTS

| 2006/0284858 A1* | 12/2006 | Rekimoto | ............... G06F 3/033 345/173 |
|---|---|---|---|
| 2007/0152984 A1* | 7/2007 | Ording | ............... G06F 3/04845 345/173 |
| 2010/0302281 A1* | 12/2010 | Kim | ............... G06F 3/04883 345/661 |
| 2013/0293572 A1 | 11/2013 | Kodimer et al. | |
| 2013/0307788 A1 | 11/2013 | Rao et al. | |
| 2014/0267437 A1* | 9/2014 | Mazzola | ............... G09G 5/373 345/661 |

FOREIGN PATENT DOCUMENTS

| JP | 2009169452 | 7/2009 |
|---|---|---|
| JP | 2011165023 | 8/2011 |
| JP | 2012008666 | 1/2012 |
| JP | 2012-048279 A | 3/2012 |
| JP | 2013020370 | 1/2013 |
| JP | 2013070194 | 4/2013 |
| JP | 2013122625 | 6/2013 |
| JP | 2013235413 | 11/2013 |
| JP | 2013-546050 A | 12/2013 |
| KR | 1020090103183 | 10/2009 |
| KR | 1020100136289 | 12/2010 |
| KR | 1020110080315 | 7/2011 |
| KR | 1020110086502 | 7/2011 |
| KR | 1020120133365 | 12/2012 |

OTHER PUBLICATIONS

Corresponding Office Action issued by the KIPO dated Jun. 25, 2015.
Corresponding Office Action issued by the JPO dated Mar. 29, 2016.
Corresponding Office Action issued in corresponding JP Application No. 2015185173 dated Jul. 3, 2018. JP.
Japanese Office Action dated on Dec. 25 2018.

* cited by examiner

SINGLE TOUCH

FIRST TOUCH → REALEASE INPUT MEANS MULTIPLE TOUCHES → SECOND TOUCH

METHOD FOR TEMPORARILY MANIPULATING OPERATION OF OBJECT IN ACCORDANCE WITH TOUCH PRESSURE OR TOUCH AREA AND TERMINAL THEREOF

CROSS REFERENCE TO RELATED APPLICATIONS

Priority is claimed under 35 U.S.C. § 119 to Korean Patent Application No.: 10-2014-0034169, filed Mar. 24, 2014, Korean Patent Application No.: 10-2014-0048336, filed Apr. 22, 2014, Korean Patent Application No.: 10-2014-0055732, filed May 9, 2014, Korean Patent Application No.: 10-2014-0098917, filed Aug. 1, 2014, Korean Patent Application No.: 10-2014-0124920, filed Sep. 19, 2014, Korean Patent Application No.: 10-2014-0145022, filed Oct. 24, 2014, and Korean Patent Application No.: 10-2014-0186352, filed Dec. 22, 2014, the disclosures of which are incorporated herein by reference in their entireties.

FIELD OF THE INVENTION

This embodiment relates to a method for temporarily manipulating operation of object in accordance with touch pressure or touch area and terminal thereof.

BACKGROUND OF THE INVENTION

Today, a variety of input-output devices are attached to electronic systems like a TV, a smartphone, an MP3 player, a PMP, a laptop computer, a PDA, etc. The various input-output devices are provided so as to allow a user to conveniently control the above systems. Since the smartphone, MP3 player, PMP, laptop computer, and PDA, etc., have a smaller size, there is a limit to attach the input-output devices. Therefore, a touch panel, a touch screen, a navigation pad, etc., are being increasingly attached as part of an effort to improve a user interface. Also, an integrated computer and tablet computer adopting the touch screen are distributed, so that there is a demand for various types of user interfaces.

Recently, a mouse and keyboard in a common personal computer is now being replaced with a touch screen capable of allowing the user to input data and to input commands even in a small space in various ways. Therefore, a variety of user interfaces on the touch screen are now being developed.

Though a conventional touch screen is used in various user interfaces without difficulty, the input through devices without the user interface has many limits, and thus, the user may feel inconvenient as much. For example, it is difficult to operate only by touching as accurately as the mouse and keyboard inputs, so that problems occur in games or web surfing. Specifically, when the user reads a book by using the conventional touch screen, the touch screen can be manipulated by two separate operations including zooming in and out on a portion that the user wants. Therefore, since the user who reads a book by using the conventional touch screen had to manipulate the two separate operations of zooming in and zooming out every time, there was an inconvenience.

SUMMARY OF THE INVENTION

One embodiment is a method for temporarily manipulating an operation of an object in accordance with a touch pressure or a touch area. The method includes: operating the object at a first state; detecting at least one of a magnitude of the touch pressure and a size of the touch area when the touch is input to a touch panel; operating the object at a second state of a first operation according to at least one of the magnitude of the touch pressure and the size of the touch area; and operating the object at the first state when the touch is released.

The operating the object at a second state of a first operation includes adjusting the second state by adjusting at least one of the magnitude of the touch pressure and the size of the touch area.

The detecting at least one of the magnitude of the touch pressure and the size of the touch area includes calculating at least one of the magnitude of the touch pressure and the size of the touch area according to a capacitance change amount caused by the touch.

The operating the object at the first state includes displaying an image on a touch screen. The operating the object at the second state of the first operation includes displaying a magnifier on the image.

The detecting at least one of the magnitude of the touch pressure and the size of the touch area includes detecting a touch position. The magnifier is displayed at a position which is offset from the touch position by a predetermined distance.

The predetermined distance is changed according to at least one of the magnitude of the touch pressure and the size of the touch area.

The magnifier is displayed in a predetermined fixed direction regardless of the rotation of the touch panel.

Another embodiment is a method for temporarily manipulating an operation of an object in accordance with a touch pressure or a touch area. The method includes: operating the object at a first state; determining whether the touch is a single touch or multiple touches; detecting at least one of a magnitude of the touch pressure and a size of the touch area when the touch is input to a touch panel; operating the object at a second state of a first operation according to at least one of the magnitude of the touch pressure and the size of the touch area if the touch is the single touch or operating the object at a second state of a second operation which is different from the first operation according to at least one of the magnitude of the touch pressure and the size of the touch area if the touch is multiple touches; and operating the object at the first state when the touch is released.

The operating the object at the first state includes displaying an image on a touch screen. The operating the object at the second state of the first operation includes displaying a magnifier on the image.

The detecting at least one of the magnitude of the touch pressure and the size of the touch area includes detecting a touch position. The magnifier is displayed at a position which is offset from the touch position by a predetermined distance.

The predetermined distance is changed according to at least one of the magnitude of the touch pressure and the size of the touch area.

The magnifier is displayed in a predetermined fixed direction regardless of the rotation of the touch panel.

The operating the object at the second state of the first operation or operating the object at the second state of the second operation includes adjusting the second state of the first operation by adjusting at least one of the magnitude of the touch pressure and the size of the touch area or adjusting the second state of the second operation by adjusting at least one of the magnitude of the touch pressure and the size of the touch area.

The detecting at least one of the magnitude of the touch pressure and the size of the touch area includes calculating at least one of the magnitude of the touch pressure and the size of the touch area according to a capacitance change amount caused by the touch.

The second operation is a reversing operation of the first operation.

Another embodiment is a terminal. The terminal includes: a touch panel; a processor which detects at least one of a magnitude of a touch pressure of a touch input to the touch panel and a size of a touch area of the touch; a controller which operates a object at a second state of a first operation according to at least one of the magnitude of the touch pressure and the size of the touch area and operates the object at the first state when the touch is released.

DETAILED DESCRIPTION OF THE INVENTION

Figure 1:
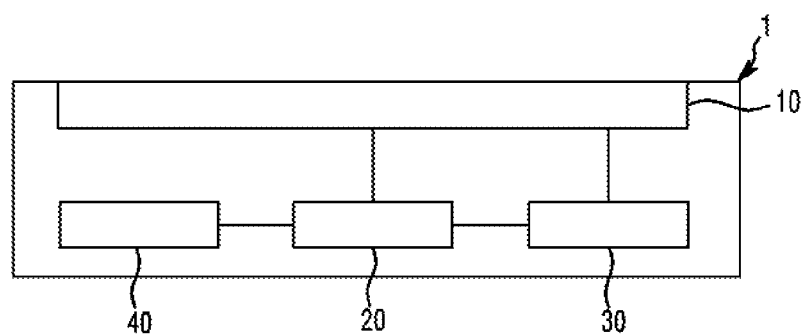
FIG. 1 is a view showing a terminal according to an embodiment of the present invention.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

Hereafter, a method for controlling a moving direction of a display object according to an embodiment of the present invention will be described with reference to the accompanying drawings. Prior to the description of the functions and features of a terminal 1 according to the embodiment of the present invention, a touch panel 10 included in the terminal 1 will be described in detail with reference to FIGS. 13 to 21.

Figure 13:
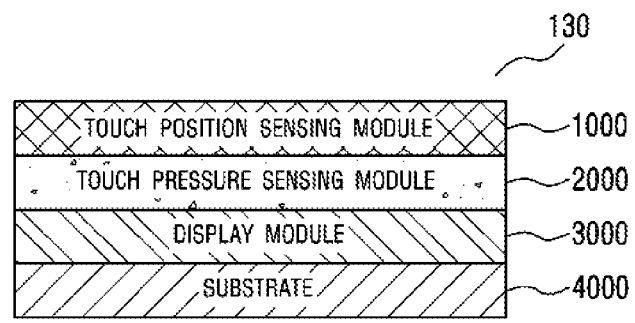
FIG. 13 is a structure view of the touch screen according to a first embodiment.

FIG. 13 is a structure view of the touch panel according to a first embodiment.

As shown in FIG. 13, the touch panel 10 may include a touch position sensing module 1000, a touch pressure sensing module 2000 disposed under the touch position sensing module 1000, a display module 3000 disposed under the touch pressure sensing module 2000, and a substrate 4000 disposed under the display module 3000. For example, the touch position sensing module 1000 and the touch pressure sensing module 2000 may be a transparent panel including a touch-sensitive surface. Hereafter, the modules 1000, 2000, 3000 and 5000 for sensing the touch position and/or touch pressure may be collectively designated as a touch sensing module.

The display module 3000 may display in such a manner as to allow a user to visually check contents. Here, the display module 3000 may display by means of a display driver. The display driver (not shown) is software allowing an operating system to manage or control a display adaptor and is a kind of a device driver.

Figure 21A:
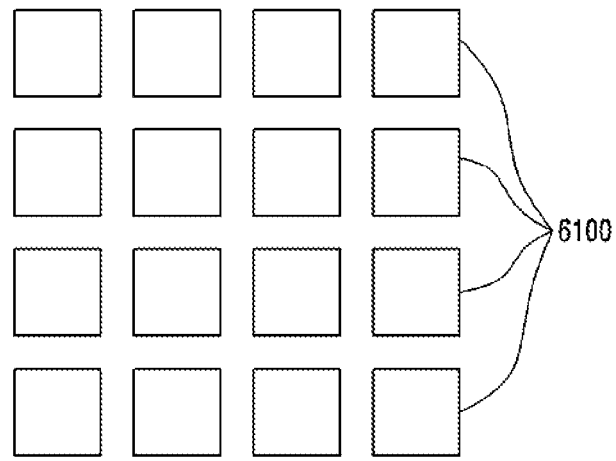
FIGS. 21a to 21d are structure views showing the shape of an electrode formed in the touch sensing module according to the embodiment.
Figure 21B:
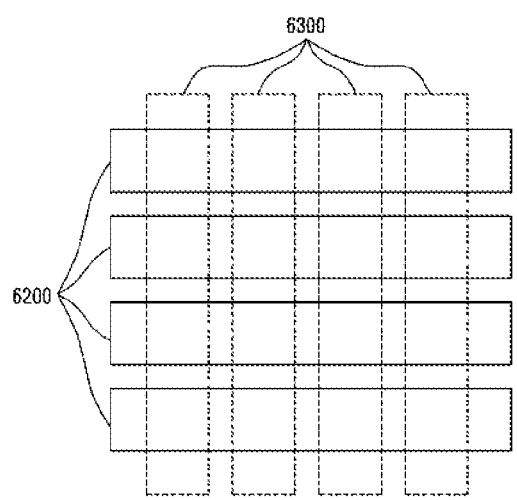
Figure 21C:
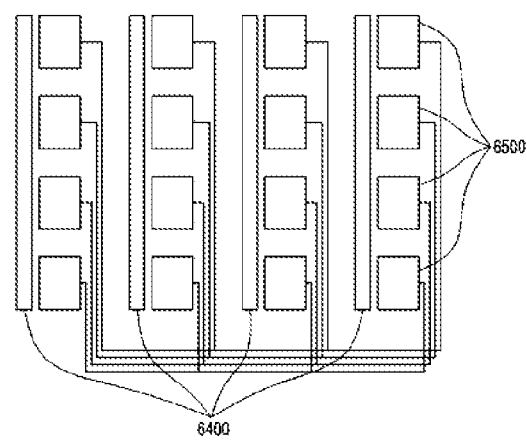

FIGS. 14a to 14d show a structure of a touch position sensing module according to the first embodiment. FIGS. 21a to 21c are structure views showing the shape of an electrode formed in the touch sensing module according to the embodiment.

Figure 14A:
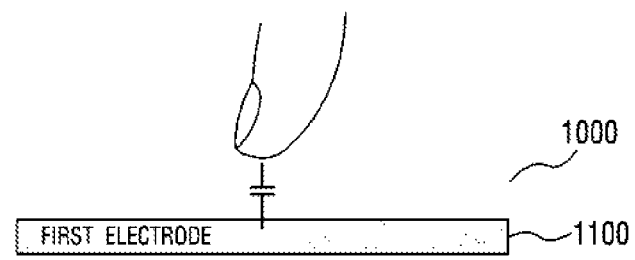
FIGS. 14a to 14d show a structure of a touch position sensing module according to the first embodiment.

As shown in FIG. 14a, the touch position sensing module 1000 according to the embodiment may include a first electrode 1100 formed in one layer. Here, the first electrode 1100 may be, as shown in FIG. 21*a*, comprised of a plurality of electrodes 6100, and then a driving signal may be input to each electrode 6100 and a sensing signal including information on self-capacitance may be output from each electrode. When an input means like a user's finger approaches the first electrode 1100, the finger functions as a ground and the self-capacitance of first electrode 1100 is changed. Therefore, the terminal 1 is able to detect the touch position by measuring the self-capacitance of the first electrode 1100, which is changed as the input means like the user's finger approaches the touch panel 10.

Figure 14B:
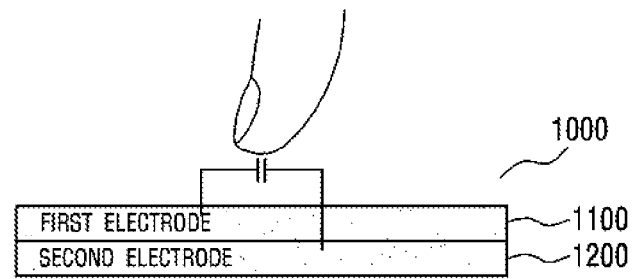

As shown in FIG. 14*b*, the touch position sensing module 1000 according to the embodiment may include the first electrode 1100 and a second electrode 1200, which are formed on different layers.

Figure 14C:
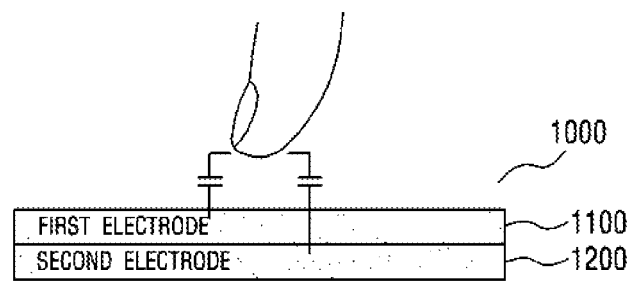

Here, the first and the second electrodes 1100 and 1200 are, as shown in FIG. 21*b*, comprised of a plurality of first electrodes 6200 and a plurality of second electrodes 6300 respectively. The plurality of first electrodes 6200 and the plurality of second electrodes 6300 may be arranged to cross each other. A driving signal may be input to any one of the first electrode 6200 and the second electrode 6300, and a sensing signal including information on mutual capacitance may be output from the other. As shown in FIG. 14*b*, when the input means like the user's finger approaches the first electrode 1100 and the second electrode 1200, the finger functions as a ground, so that the mutual capacitance between the first electrode 1100 and the second electrode 1200 is changed. In this case, the terminal 1 measures the mutual capacitance between the first electrode 1100 and the second electrode 1200, which is changed with the approach of the object like the user's finger to the touch panel 10, and then detects the touch position. Also, the driving signal may be input to the first electrode 6200 and the second electrode 6300, and a sensing signal including information on the self-capacitance may be output from the first and second electrodes 6200 and 6300 respectively. As shown in FIG. 14*c*, when the object like the user's finger approaches the first electrode 1100 and the second electrode 1200, the finger functions as a ground, so that the self-capacitance of each of the first and second electrodes 1100 and 1200 is changed. In this case, the terminal 1 measures the self-capacitances of the first electrode 1100 and the second electrode 1200, which is changed with the approach of the object like the user's finger to the touch panel 10, and then detects the touch position.

Figure 14D:
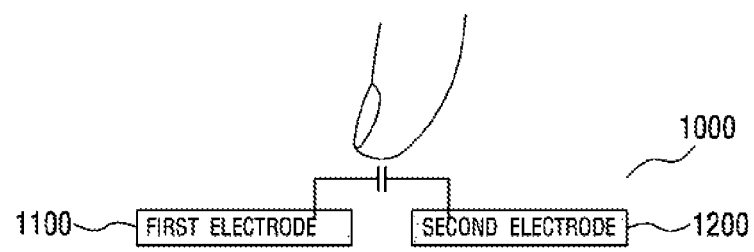

As shown in FIG. 14*d*, the touch position sensing module 1000 according to the embodiment may include the first electrode 1100 formed in one layer and the second electrode 1200 formed in the same layer as the layer in which the first electrode 1100 has been formed.

Here, the first and the second electrodes 1100 and 1200 are, as shown in FIG. 21*c*, comprised of a plurality of first electrodes 6400 and a plurality of second electrodes 6500 respectively. The plurality of first electrodes 6400 and the plurality of second electrodes 6500 may be arranged without crossing each other and may be arranged such that the plurality of second electrodes 6500 are connected to each other in a direction crossing the extension direction of the each first electrodes 6400. A principle of detecting the touch position by using the first electrode 6400 or the second electrode 6500 shown in FIG. 14*d* is the same as that of the foregoing referring to FIG. 14*c*, and thus a description of the principle will be omitted.

FIGS. 15*a* to 15*f* show a structure of the touch pressure sensing module according to the first embodiment. FIGS. 21*a* to 21*d* are structure views showing the shape of the electrode formed in the touch pressure sensing module 2000 according to the embodiment.

As shown in FIGS. 15*a* to 15*f*, the touch pressure sensing module 2000 according to the first embodiment may include a spacer layer 2400. The spacer layer 2400 may be implemented by an air gap. The spacer may be comprised of an impact absorbing material according to the embodiment and may be also filled with a dielectric material according to the embodiment.

As shown in FIGS. 15*a* to 15*d*, the touch pressure sensing module 2000 according to the first embodiment may include a reference potential layer 2500. The reference potential layer 2500 may have any potential. For example, the reference potential layer may be a ground layer having a ground potential. Here, the reference potential layer may include a layer which is parallel with a two-dimensional plane in which a below-described first electrode 2100 for sensing the touch pressure has been formed or a two-dimensional plane in which a below-described second electrode 2200 for sensing the touch pressure has been formed. Although it has been described in FIGS. 15*a* to 15*d* that the touch pressure sensing module 2000 includes the reference potential layer 2500, there is no limit to this. The touch pressure sensing module 2000 does not include the reference potential layer 2500, and the display module 3000 or the substrate 4000 which is disposed under the touch pressure sensing module 2000 may function as the reference potential layer.

Figure 15A:
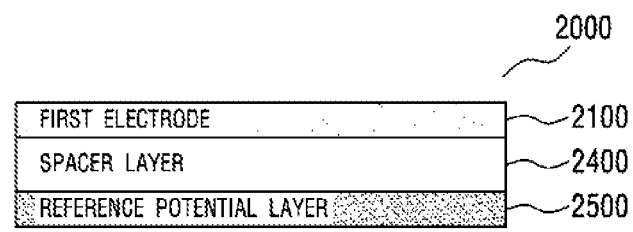
FIGS. 15a to 15f show a structure of the touch pressure sensing module according to the first embodiment.

As shown in FIG. 15*a*, the touch pressure sensing module 2000 according to the embodiment may include the first electrode 2100 formed in one layer, the spacer layer 2400 formed under the layer in which the first electrode 2100 has been formed, and the reference potential layer 2500 formed under the spacer layer 2400.

Figure 15B:
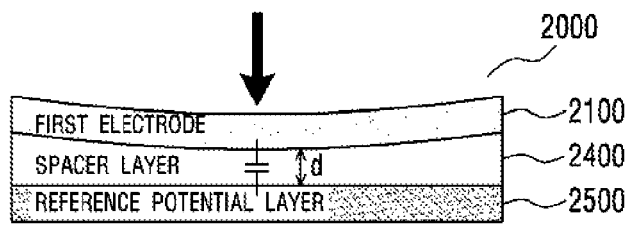
Figure 21D:
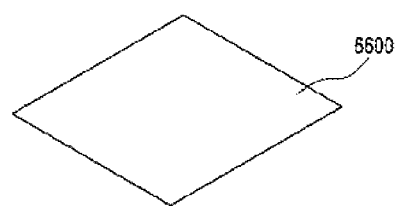

Here, the first electrode 2100 is, as shown in FIG. 21*a*, comprised of the plurality of electrodes 6100. Then, the driving signal may be input to each of the electrodes 6100 and the sensing signal including information on the self-capacitance may be output from the each electrode. When a pressure is applied to the touch panel 10 by the object like the user's finger or stylus, the first electrode 2100 is, as shown in FIG. 15*b*, curved at least at the touch position, so that a distance "d" between the first electrode 2100 and the reference potential layer 2500 is changed, and thus, the self-capacitance of the first electrode 2100 is changed. Accordingly, the terminal 1 is able to detect the touch pressure by measuring the self-capacitance of the first electrode 2100, which is changed by the pressure that the object like the user's finger or stylus applies to the touch panel 10. As such, since the first electrode 2100 is comprised of the plurality of electrodes 6100, the terminal 1 is able to detect the pressure of each of multiple touches which have been simultaneously input to the touch panel 10. Also, when there is no requirement for detecting the pressure of each of multiple touches, it is only required to detect overall pressure applied to the touch panel 10 irrespective of the touch position. Therefore, the first electrode 2100 of the touch pressure sensing module 2000 may be, as shown in FIG. 21*d*, comprised of one electrode 6600.

Figure 15C:
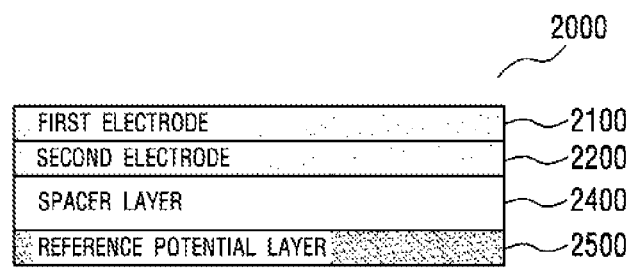

As shown in FIG. 15*c*, the touch pressure sensing module 2000 according to the embodiment may include the first electrode 2100, the second electrode 2200 formed under the layer in which the first electrode 2100 has been formed, the spacer layer 2400 formed under the layer in which the second electrode 2200 has been formed, and the reference potential layer 2500 formed under the spacer layer 2400.

Figure 15D:
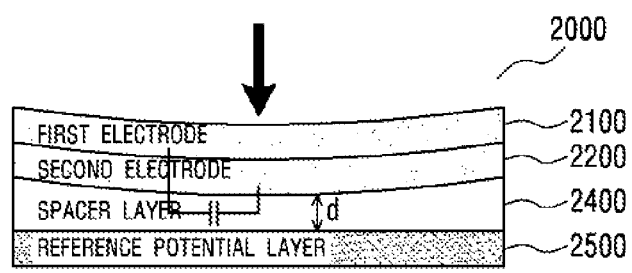

Here, the first electrode 2100 and the second electrode 2200 may be configured and arranged as shown in FIG. 21*b*. A driving signal is input to any one of the first electrode 6200 and the second electrode 6300, and a sensing signal including information on the mutual capacitance may be output from the other. When a pressure is applied to the touch panel 10, the first electrode 2100 and the second electrode 2200 are, as shown in FIG. 15*d*, curved at least at the touch position, so that a distance "d" between the reference potential layer 2500 and both the first electrode 2100 and the second electrode 2200 is changed, and thus, the mutual capacitance between the first electrode 2100 and the second electrode 2200 is changed. Accordingly, the touch input device 100 is able to detect the touch pressure by measuring the mutual capacitance between the first electrode 2100 and the second electrode 2200, which is changed by the pressure that is applied to the touch panel 10. As such, since the first electrode 2100 and the second electrode 2200 are comprised of the plurality of first electrodes 6200 and the plurality of second electrodes 6300 respectively, the action control system 1 is able to detect the pressure of each of multiple touches which have been simultaneously input to the touch panel 10. Also, when there is no requirement for detecting the pressure of each of multiple touches, at least one of the first electrode 2100 and the second electrode 2200 of the touch pressure sensing module 2000 may be, as shown in FIG. 21*d*, comprised of the one electrode 6600.

Here, even when the first electrode 2100 and the second electrode 2200 are formed in the same layer, the touch pressure can be also detected as described in FIG. 15*c*. The first electrode 2100 and the second electrode 2200 may be configured and arranged as shown in FIG. 21*c*, or may be comprised of the one electrode 6600 as shown in FIG. 21*d*.

Figure 15E:
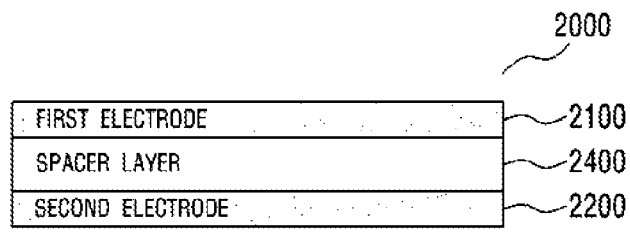

As shown in FIG. 15*e*, the touch pressure sensing module 2000 according to the embodiment may include the first electrode 2100 formed in one layer, the spacer layer 2400 formed under the layer in which the first electrode 2100 has been formed, and the second electrode 2200 formed under the spacer layer 2400.

Figure 15F:
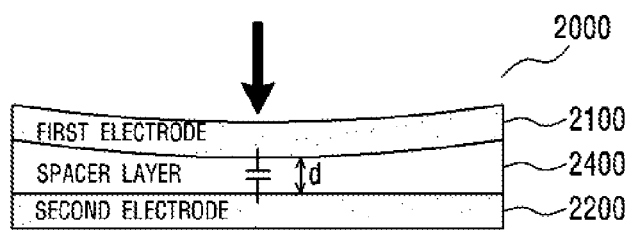

In FIG. 15*e*, the configuration and operation of the first electrode 2100 and the second electrode 2200 are the same as those of the foregoing referring to FIG. 15*c*, and thus, a description of the configuration and operation will be omitted. When a pressure is applied to the touch panel 10, the first electrode 2100 is, as shown in FIG. 15*f*, curved at least at the touch position, so that a distance "d" between the first electrode 2100 and the second electrode 2200 is changed, and thus, the mutual capacitance between the first electrode 2100 and the second electrode 2200 is changed. Accordingly, the terminal 1 is able to detect the touch pressure by measuring the mutual capacitance between the first electrode 2100 and the second electrode 2200.

Figure 16:
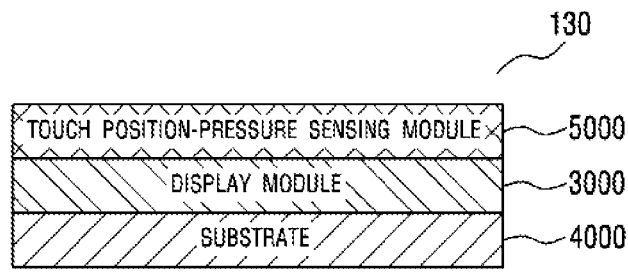
FIG. 16 is a structure view of the touch screen according to a second embodiment.

As shown in FIG. 16, a touch panel 10 according to a second embodiment may include a touch position-pressure sensing module 5000, a display module 3000 disposed under the touch position-pressure sensing module 5000, and a substrate 4000 disposed under the display module 3000.

Unlike the embodiment shown in FIG. 13, the touch position-pressure sensing module 5000 according to the embodiment shown in FIG. 16 includes at least one electrode for sensing the touch position, and at least one electrode for sensing the touch pressure. At least one of the electrodes is used to sense both the touch position and the touch pressure. As such, the electrode for sensing the touch position and the electrode for sensing the touch pressure are shared, so that it is possible to reduce the manufacturing cost of the touch position-pressure sensing module, to reduce the overall thickness of the touch panel 10 and to simplify the manufacturing process. In the sharing of the electrode for sensing the touch position and the electrode for sensing the touch pressure, when it is necessary to distinguish between the sensing signal including information on the touch position and the sensing signal including information on the touch pressure, it is possible to distinguish and sense the touch position and the touch pressure by differentiating a frequency of the driving signal for sensing the touch position from a frequency of the driving signal for sensing the touch pressure, or by differentiating a time interval for sensing the touch position from a time interval for sensing the touch pressure.

FIGS. 17*a* to 17*k* show a structure of the touch position-pressure sensing module according to the second embodiment. As shown in FIGS. 17*a* to 17*k*, the touch position-pressure sensing module 5000 according to the second embodiment may include a spacer layer 5400.

As shown in FIGS. 17*a* to 17*i*, the touch position-pressure sensing module 5000 according to the embodiment may include a reference potential layer 5500. The reference potential layer 5500 is the same as that of the foregoing referring to FIGS. 15*a* to 15*d*, and thus, a description of the reference potential layer 5500 will be omitted. The reference potential layer may include a layer which is parallel with a two-dimensional plane in which a below-described first electrode 5100 for sensing the touch pressure has been formed, a two-dimensional plane in which a below-described second electrode 5200 for sensing the touch pressure has been formed, or a two-dimensional plane in which a below-described third electrode 5300 for sensing the touch pressure has been formed.

Figure 17A:
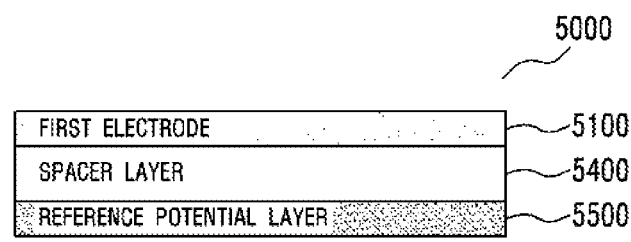
FIGS. 17a to 17k show a structure of the touch position-pressure sensing module according to the second embodiment.

As shown in FIG. 17*a*, the touch position-pressure sensing module 5000 according to the embodiment may include the first electrode 5100 formed in one layer, the spacer layer 5400 formed under the layer in which the first electrode 5100 has been formed, and the reference potential layer 5500 formed under the spacer layer 5400.

Figure 17B:
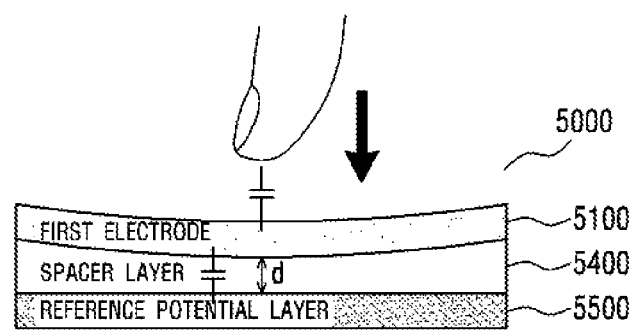

A description of the configuration of FIGS. 17*a* and 17*b* is similar to the description referring to FIGS. 15*a* and 15*b*. Hereafter, only the difference between them will be described. As shown in FIG. 17*b*, when the object like the user's finger approaches the first electrode 5100, the finger functions as a ground and the touch position can be detected by the change of the self-capacitance of the first electrode 5100. Also, when a pressure is applied to the touch panel 10 by the object, a distance "d" between the first electrode 5100 and the reference potential layer 5500 is changed, and thus, the touch pressure can be detected by the change of the self-capacitance of the first electrode 5100.

Figure 17C:
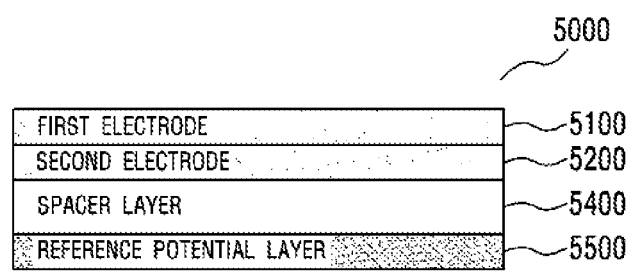

As shown in FIG. 17*c*, the touch position-pressure sensing module 5000 according to the embodiment may include the first electrode 5100 formed in one layer, the second electrode 5200 formed in a layer under the layer in which the first electrode 5100 has been formed, the spacer layer 5400 formed under the layer in which the second electrode 5200 has been formed, and the reference potential layer 5500 formed under the spacer layer 5400.

Figure 17D:
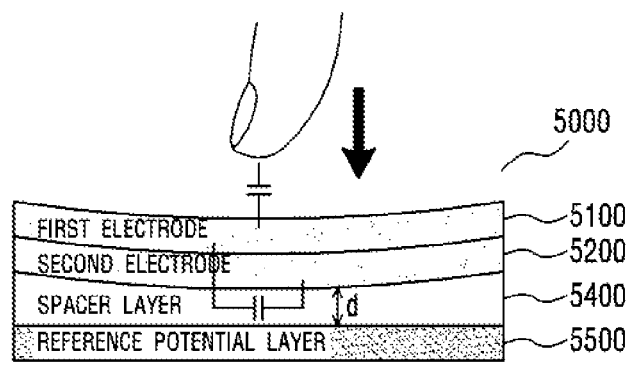

A description of the configuration of FIGS. 17*c* to 17*f* is similar to the description referring to FIGS. 15*c* and 15*d*. Hereafter, only the difference between them will be described. Here, the first electrode 5100 and the second electrode 5200 may be, as shown in FIG. 21*a*, comprised of the plurality of electrodes 6100 respectively. As shown in FIG. 17*d*, when the object like the user's finger approaches the first electrode 5100, the finger functions as a ground and the touch position can be detected by the change of the self-capacitance of the first electrode 5100. Also, when a pressure is applied to the touch panel 10 by the object, a distance "d" between the reference potential layer 5500 and both the first electrode 5100 and the second electrode 5200 is changed, and thus, the touch pressure can be detected by the change of the mutual capacitance between the first electrode 5100 and the second electrode 5200.

Also, according to the embodiment, each of the first and second electrodes 5100 and 5200 may be, as shown in FIG. 21*b*, comprised of the plurality of first electrodes 6200 and the plurality of second electrodes 6300. The plurality of first electrodes 6200 and the plurality of second electrodes 6300 may be arranged to cross each other. Here, the touch position can be detected by the change of the mutual capacitance between the first electrode 5100 and the second electrode 5200, and the touch pressure can be detected by the change of the self-capacitance of the second electrode 5200 according to the change of a distance "d" between the second electrode 5200 and the reference potential layer 5500. Also, according to the embodiment, the touch position can be detected by the change of the mutual capacitance between the first electrode 5100 and the second electrode 5200, and also, the touch pressure can be detected by the change of the mutual capacitance between the first electrode 5100 and the second electrode 5200 according to the change of the distance "d" between the reference potential layer 5500 and both the first electrode 5100 and the second electrode 5200.

Here, even when the first electrode 5100 and the second electrode 5200 are formed in the same layer, the touch position and touch pressure can be also detected as described with reference to FIGS. 17*c* and 17*d*. However, in FIGS. 17*c* and 17*d*, regarding the embodiment where the electrode should be configured as shown in FIG. 21*b*, when the first electrode 5100 and the second electrode 5200 are formed in the same layer, the first electrode 5100 and the second electrode 5200 may be configured as shown in FIG. 21*c*.

Figure 17E:
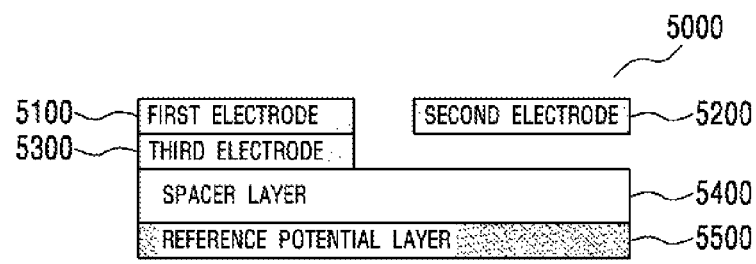

As shown in FIG. 17*e*, the touch position-pressure sensing module 5000 according to the embodiment may include the first electrode 5100 and the second electrode 5200 which have been in the same layer, the third electrode 5300 which has been formed in a layer under the layer in which the first electrode 5100 and the second electrode 5200 have been formed, the spacer layer 5400 formed under the layer in which the third electrode 5300 has been formed, and the reference potential layer 5500 formed under the spacer layer 5400.

Figure 17F:
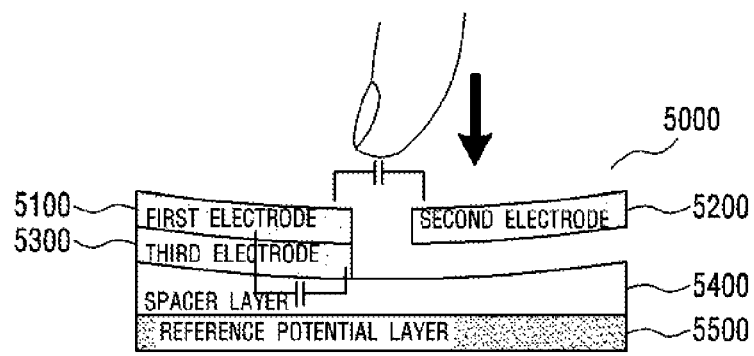

Here, the first electrode 5100 and the second electrode 5200 may be configured and arranged as shown in FIG. 21*c*, and the first electrode 5100 and the third electrode 5300 may be configured and arranged as shown in FIG. 21*b*. As shown in FIG. 17*f*, when the object like the user's finger approaches the first electrode 5100 and the second electrode 5200, the mutual capacitance between the first electrode 5100 and the second electrode 5200 is changed, so that the touch position can be detected. When a pressure is applied to the touch panel 10 by the object, a distance "d" between the reference potential layer 5500 and both the first electrode 5100 and the third electrode 5300 is changed, and then the mutual capacitance between the first electrode 5100 and the third electrode 5300 is hereby changed, so that the touch pressure can be detected. Also, according to the embodiment, the touch position can be detected by the change of the mutual capacitance between the first electrode 5100 and the third electrode 5300, and the touch pressure can be detected by the change of the mutual capacitance between the first electrode 5100 and the second electrode 5200.

Figure 17G:
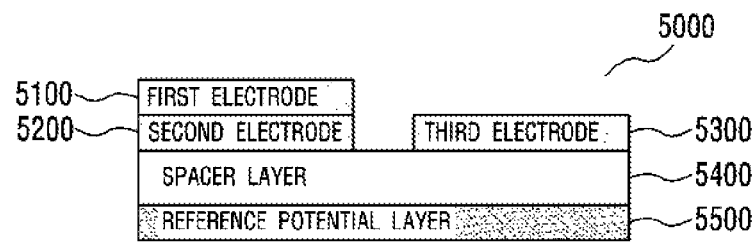

As shown in FIG. 17*g*, the touch position-pressure sensing module 5000 according to the embodiment may include the first electrode 5100 formed in one layer, the second electrode 5200 formed in a layer under the layer in which the first electrode 5100 has been formed, the third electrode 5300 formed in the same layer as the layer in which the second electrode 5200 has been formed, the spacer layer 5400 formed under the layer in which the second electrode 5200 and the third electrode 5300 have been formed, and the reference potential layer 5500 formed under the spacer layer 5400.

Figure 17H:
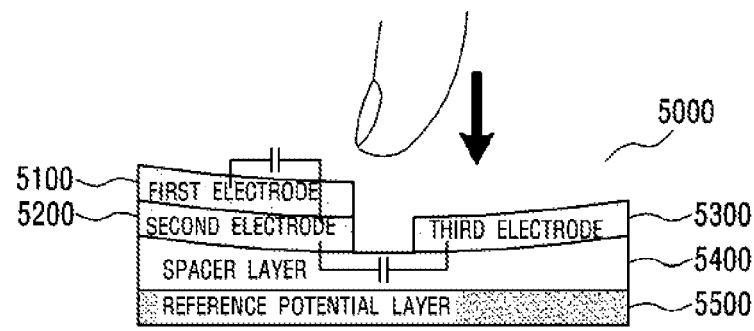

Here, the first electrode 5100 and the second electrode 5200 may be configured and arranged as shown in FIG. 21*b*, and the second electrode 5200 and the third electrode 5300 may be configured and arranged as shown in FIG. 21*c*. In FIG. 17*h*, the touch position can be detected by the change of the mutual capacitance between the first electrode 5100 and the second electrode 5200, and the touch pressure can be detected by the change of the mutual capacitance between the second electrode 5200 and the third electrode 5300. Also, according to the embodiment, the touch position can be detected by the change of the mutual capacitance between the first electrode 5100 and the third electrode 5300, and the touch pressure can be detected by the change of the mutual capacitance between the first electrode 5100 and the second electrode 5200.

Figure 17I:
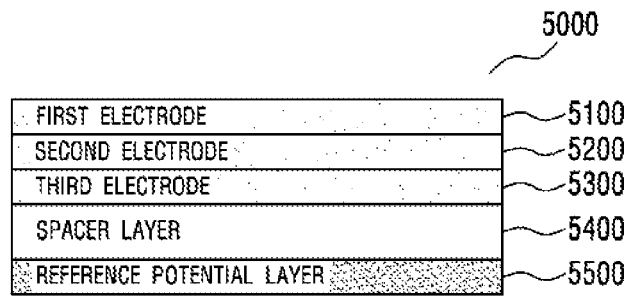

As shown in FIG. 17*i*, the touch position-pressure sensing module 5000 according to the embodiment may include the first electrode 5100 formed in one layer, the second electrode 5200 formed in a layer under the layer in which the first electrode 5100 has been formed, the third electrode 5300 formed under the layer in which the second electrode 5200 has been formed, the spacer layer 5400 formed under the layer in which the third electrode 5300 has been formed, and the reference potential layer 5500 formed under the spacer layer 5400.

Here, the first electrode 5100 and the second electrode 5200 may be configured and arranged as shown in FIG. 21*b*, and the second electrode 5200 and the third electrode 5300 may be also configured and arranged as shown in FIG. 21*b*. Here, when the object like the user's finger approaches the first electrode 5100 and the second electrode 5200, the finger functions as a ground and the touch position can be detected by the change of the mutual capacitance between the first electrode 5100 and the second electrode 5200. Also, when a pressure is applied to the touch panel 10 by the object, a distance "d" between the reference potential layer 5500 and both the second electrode 5200 and the third electrode 5300 is changed, so that the touch pressure can be detected by the change of the mutual capacitance between the second electrode 5200 and the third electrode 5300. Also, according to the embodiment, when the object like the user's finger approaches the first electrode 5100 and the second electrode 5200, the finger functions as a ground, so that the touch position can be detected by the change of the self-capacitance of each of the first and second electrodes 5100 and 5200.

Figure 17J:
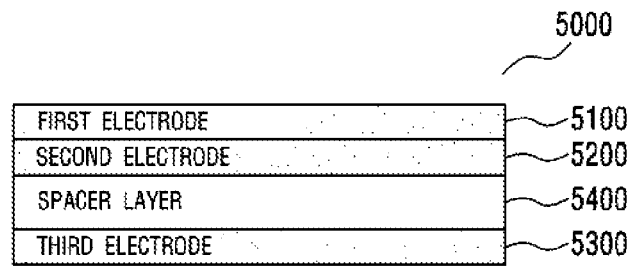

As shown in FIG. 17*j*, the touch position-pressure sensing module 5000 according to the embodiment may include the first electrode 5100 formed in one layer, the second electrode 5200 formed in a layer under the layer in which the first electrode 5100 has been formed, the spacer layer 5400 formed under the layer in which the second electrode 5200 has been formed, and the third electrode 5300 formed under the spacer layer 5400.

Here, the first electrode 5100 and the second electrode 5200 may be configured and arranged as shown in FIG. 21*b*, and the third electrode 5300 may be configured as shown in FIG. 21*a* or the second electrode 5200 and the third electrode 5300 may be also configured and arranged as shown in FIG. 21*b*. Here, when the object like the user's finger approaches the first electrode 5100 and the second electrode 5200, the finger functions as a ground and the touch position can be detected by the change of the mutual capacitance between the first electrode 5100 and the second electrode 5200. Also, when a pressure is applied to the touch panel 10 by the object, a distance "d" between the second electrode 5200 and the third electrode 5300 is changed, so that the touch pressure can be detected by the change of the mutual capacitance between the second electrode 5200 and the third electrode 5300. Also, according to the embodiment, when the object like the user's finger approaches the first electrode 5100 and the second electrode 5200, the finger functions as a ground, so that the touch position can be detected by the change of the self-capacitance of each of the first and second electrodes 5100 and 5200.

Figure 17K:
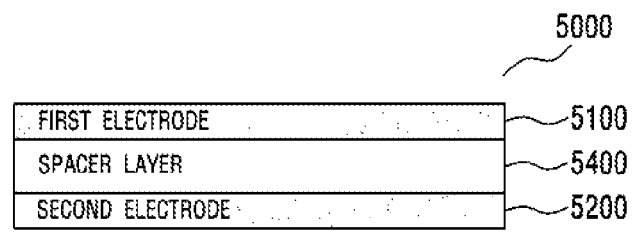

As shown in FIG. 17*k*, the touch position-pressure sensing module 5000 according to the embodiment may include the first electrode 5100 formed in one layer, the spacer layer 5400 formed under the layer in which the first electrode 5100 has been formed, and the second electrode 5200 formed under the spacer layer 5400.

Here, the first electrode 5100 and the second electrode 5200 may be configured and arranged as shown in FIG. 21*b*. Here, the touch position can be detected by the change of the mutual capacitance between the first electrode 5100 and the second electrode 5200. Also, when a pressure is applied to the touch panel 10 by the object, a distance "d" between the first electrode 5100 and the second electrode 5200 is changed, so that the touch pressure can be detected by the change of the mutual capacitance between the first electrode 5100 and the second electrode 5200. The first electrode 5100 and the second electrode 5200 may be configured and arranged as shown in FIG. 21*a*. Here, when the object like the user's finger approaches the first electrode 5100, the finger functions as a ground and the self-capacitance of the first electrode 5100 is changed, so that the touch position can be detected. Also, the touch pressure can be detected by the change of the mutual capacitance between the first electrode 5100 and the second electrode 5200.

Figure 18:
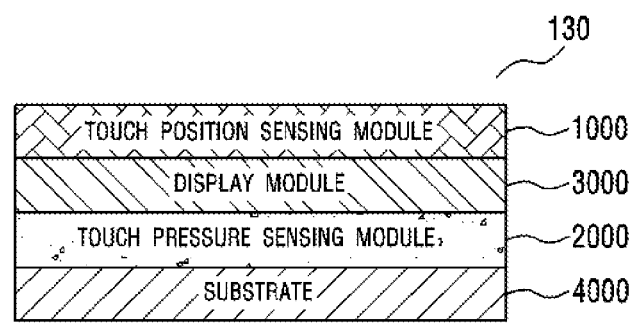
FIG. 18 is a structure view of the touch screen according to a third embodiment.

As shown in FIG. 18, a touch panel 10 according to a third embodiment may include the touch position sensing module 1000, the display module 3000 disposed under the touch position sensing module 1000, the touch pressure sensing module 2000 disposed under the display module 3000, and the substrate 4000 disposed under the touch pressure sensing module 2000.

In the touch panels 10 according to the embodiment shown in FIGS. 13 and 16, since the touch pressure sensing module 2000 which includes the spacer layer 2400 or the touch position-pressure sensing module 5000 which includes the spacer layer 5400 is disposed on the display module 3000, the color clarity, visibility, optical transmittance of the display module 3000 may be reduced. Therefore, in order to prevent such problems, the touch position sensing module 1000 and the display module 3000 are fully laminated by using an adhesive like an optically clear adhesive (OCA), and the touch pressure sensing module 2000 is disposed under the display module 3000. As a result, the aforementioned problem can be alleviated and solved. Also, an existing gap formed between the display module 3000 and the substrate 4000 is used as the spacer layer for detecting the touch pressure, so that the overall thickness of the touch panel 10 can be reduced.

The touch position sensing module 1000 according to the embodiment shown in FIG. 18 is the same as the touch position sensing module shown in FIGS. 14*a* to 14*d*.

Figure 19A:
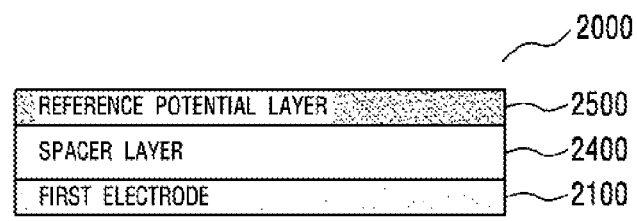
FIGS. 19a to 19b show a structure of the touch position-pressure sensing module according to the third embodiment.
Figure 19B:
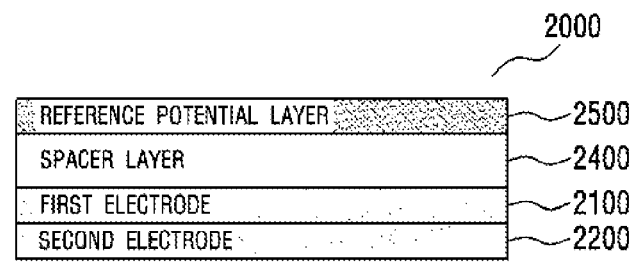

The touch pressure sensing module 2000 according to the embodiment shown in FIG. 18 may be the touch pressure sensing module shown in FIGS. 15*a* to 15*f* and the touch pressure sensing module shown in FIGS. 19*a* to 19*b*.

As shown in FIG. 19*a*, the touch pressure sensing module 2000 according to the embodiment may include the reference potential layer 2500, the spacer layer 2400 formed under the reference potential layer 2500, and the first electrode 2100 formed under the spacer layer 2400. Since the configuration and operation of FIG. 19*a* are the same as those of FIGS. 15*a* and 15*b* with the exception of the fact that the position of the reference potential layer 2500 and the position of the first electrode 2100 are replaced with each other, repetitive descriptions thereof will be omitted hereafter.

As shown in FIG. 19*b*, the touch pressure sensing module 2000 according to the embodiment may include the reference potential layer 2500, the spacer layer 2400 formed under the ground, the first electrode 2100 formed in a layer under the spacer layer 2400, and the second electrode 2200 formed in a layer under the layer in which the first electrode 2100 has been formed. Since the configuration and operation of FIG. 19*b* are the same as those of FIGS. 15*c* and 15*d* with the exception of the fact that the position of the reference potential layer 2500, the position of the first electrode 2100 and the position of the second electrode 2200 are replaced with each other, repetitive descriptions thereof will be omitted hereafter. Here, even when the first electrode 2100 and the second electrode 2200 are formed in the same layer, the touch pressure can be detected as described in FIGS. 15*c* and 15*d*.

Although it has been described in FIG. 18 that the display module 3000 is disposed under the touch position sensing module 1000, the touch position sensing module 1000 can be included within the display module 3000. Also, although it has been described in FIG. 18 that the touch pressure sensing module 2000 is disposed under the display module 3000, a portion of the touch pressure sensing module 2000 can be included within the display module 3000. Specifically, the reference potential layer 2500 of the touch pressure sensing module 2000 may be disposed within the display module 3000, and the electrodes 2100 and 2200 may be formed under the display module 3000. As such, when the reference potential layer 2500 is disposed within the display module 3000, a gap formed within the display module 3000 is used as the spacer layer for detecting the touch pressure, so that the overall thickness of the touch panel 10 can be reduced. Here, the electrodes 2100 and 2200 may be formed on the substrate 4000. As such, when the electrodes 2100 and 2200 are formed on the substrate 4000, not only the gap formed within the display module 3000 but also the gap formed between the display module 3000 and the substrate 4000 is used as the spacer layer for detecting the touch pressure, so that the sensitivity for detecting the touch pressure can be more improved.

Figure 20A:
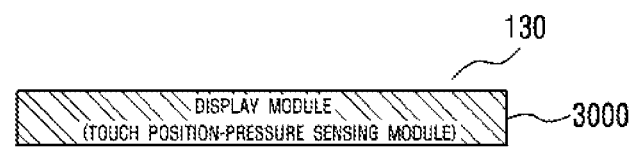
FIG. 20a shows a structure of the touch screen according to a fourth embodiment.

FIG. 20*a* shows a structure of the touch panel according to a fourth embodiment. As shown in FIG. 20*a*, the touch panel 10 according to the fourth embodiment may include at least one of the touch position sensing module and the touch pressure sensing module within the display module 3000.

Figure 20B:
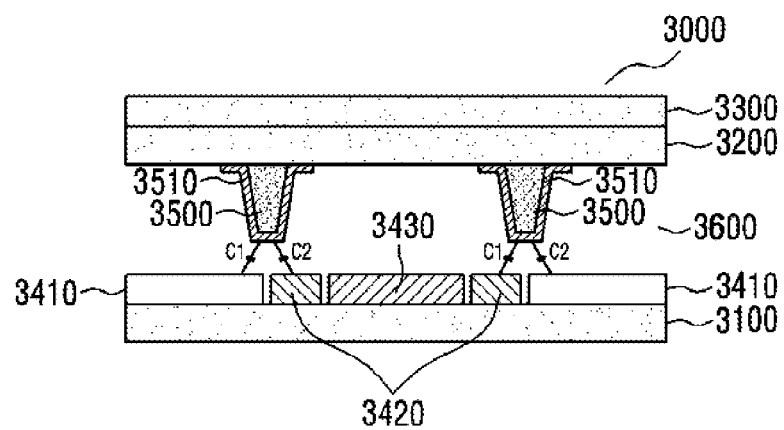
FIGS. 20b and 20c are respectively structure views of touch pressure sensing and touch position sensing of the touch screen according to the fourth embodiment.
Figure 20C:
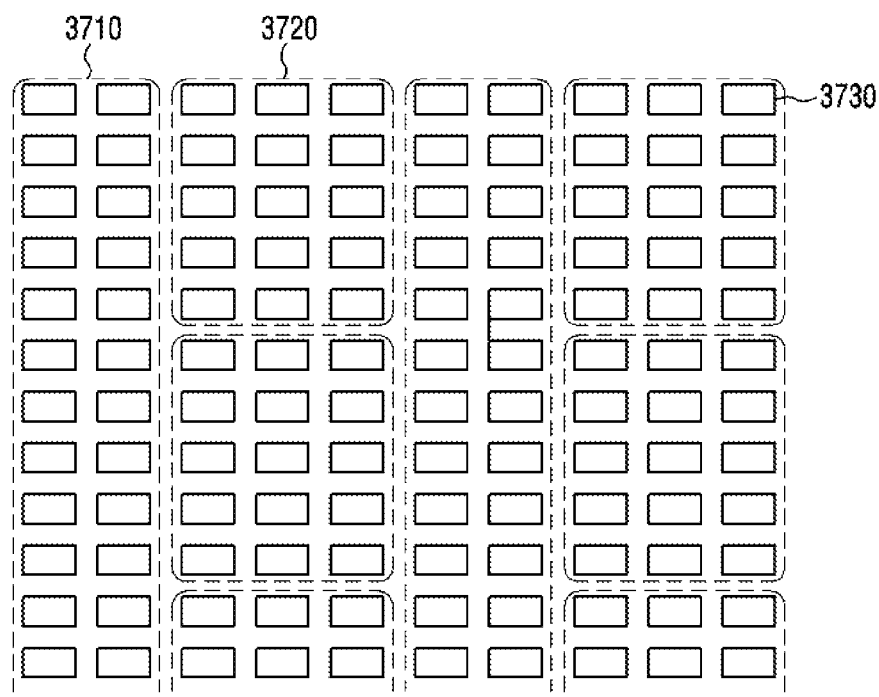

FIGS. 20*b* and 20*c* are structure views of touch pressure sensing and touch position sensing of the touch panel according to the fourth embodiment. FIGS. 15*b* and 15*c* take an LCD panel as an example of the display module 3000.

In case of the LCD panel, the display module 3000 may include a TFT layer 3100 and a color filter layer 3300. The TFT layer 3100 includes a TFT substrate layer 3110 disposed directly thereon. The color filter layer 3300 includes a color filter substrate layer 3200 disposed directly thereunder. The display module 3000 includes a liquid crystal layer 3600 between the TFT layer 3100 and the color filter layer 3300. Here, the TFT substrate layer 3110 includes electrical components necessary to generate an electric field driving the liquid crystal layer 3600. Particularly, the TFT substrate layer 3110 may be comprised of various layers including a data line, a gate line, TFT, a common electrode, a pixel electrode and the like. These electrical components generate a controlled electric field and orient the liquid crystals in the liquid crystal layer 3600. More specifically, The TFT substrate layer 3110 may include a column common electrode (column Vcom) 3430, a low common electrode (low Vcom) 3410, and a guard shield electrode 3420. The guard shield electrode 3420 is located between the column common electrode 3430 and the low common electrode 3410 and is able to minimize the interference caused by a fringe field which may be generated between the column common electrode 3430 and the low common electrode 3410. The foregoing description of the LCD panel is apparent to those skilled in the art.

As shown in FIG. 20b, the display module 3000 according to the embodiment of the present invention may include sub-photo spacers 3500 disposed on the color filter substrate layer 3200. These sub-photo spacers 3500 may be disposed on the interface between the low common electrode 3410 and the adjacent guard shield electrode 3420. Here, a conductive material layer 3510 like ITO may be patterned on the sub-photo spacer 3500. Here, a fringing capacitance C1 is formed between the low common electrode 3410 and the conductive material layer 3510, and a fringing capacitance C2 is formed between the guard shield electrode 3420 and the conductive material layer 3510.

When the display module 3000 shown in FIG. 20b functions as the touch pressure sensing module, a distance between the sub-photo spacers 3500 and the TFT substrate layer 3110 may be reduced by an external pressure, and thus, a capacitance between the low common electrode 3410 and the guard shield electrode 3420 may be reduced. Accordingly, in FIG. 20b, the conductive material layer 3510 functions as the reference potential layer and detects the change of the capacitance between the low common electrode 3410 and the guard shield electrode 3420, so that the touch pressure can be detected.

FIG. 20c shows a structure in which the LCD panel as the display module 3000 is used as the touch position sensing module. The arrangement of the common electrodes 3730 is shown in FIG. 20c. Here, for the purpose of detecting the touch position, these common electrodes 3730 may be divided into a first area 3710 and a second area 3720. Accordingly, for example, the common electrodes 3730 included in one first area 3710 may be operated in such a manner as to function in response to the first electrode 6400 of FIG. 21c, and the common electrodes 3730 included in one second area 3720 may be operated in such a manner as to function in response to the second electrode 6500 of FIG. 21c. That is, in order that the common electrodes 3730, i.e., electrical components for driving the LCD panel are used to detect the touch position, the common electrodes 3730 may be grouped. Such a grouping can be accomplished by a structural configuration and manipulation of operation.

As described above, in FIG. 20, the electrical components of the display module 3000 are caused to operate in conformity with their original purpose, so that the display module 3000 performs its own function. Also, at least some of the electrical components of the display module 3000 are caused to operate for detecting the touch pressure, so that the display module 3000 functions as the touch pressure sensing module. Also, at least some of the electrical components of the display module 3000 are caused to operate for detecting the touch position, so that the display module 3000 functions as the touch position sensing module. Here, each operation mode may be performed in a time-division manner. In other words, the display module 3000 may function as the display module in a first time interval, as the pressure sensing module in a second time interval, and/or as the position sensing module in a third time interval.

FIGS. 20b and 20c only show the structures for the detection of the touch pressure and the touch position respectively for convenience of description. So long as the display module 3000 can be used to detect the touch pressure and/or the touch position by operating the electrical components for the display operation of the display module 3000, the display module 3000 can be included in the fourth embodiment.

Figure 2A:
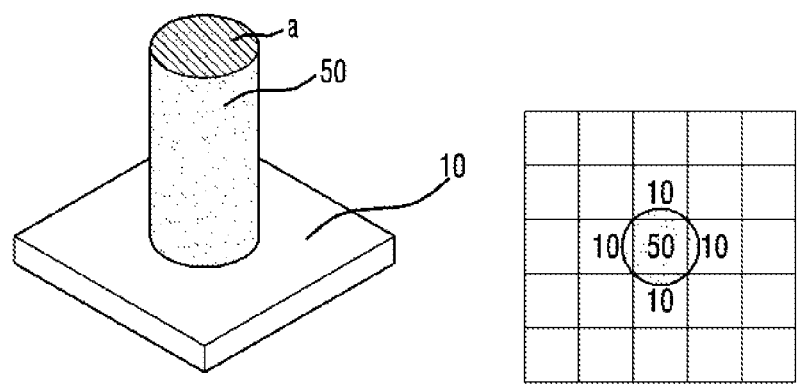
FIGS. 2a and 2b are views for describing a capacitance change amount according to the size of a touch area.
Figure 2B:
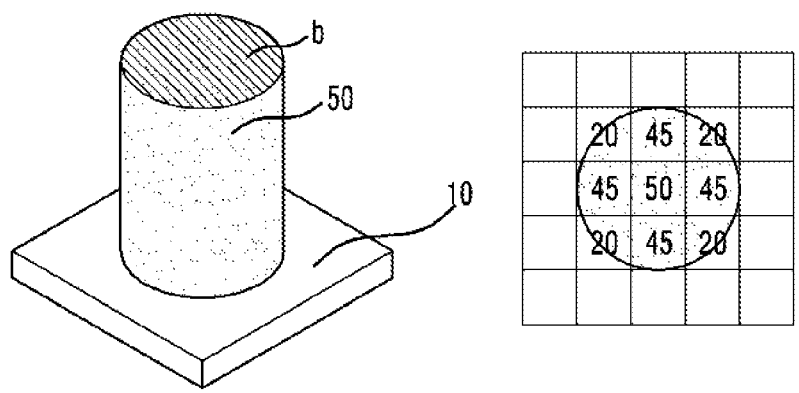
Figure 3A:
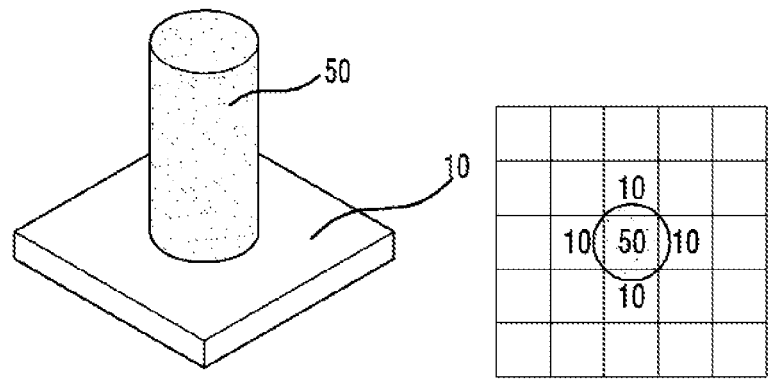
FIGS. 3a and 3b are views for describing the capacitance change amount according to the magnitude of a touch pressure.
Figure 3B:
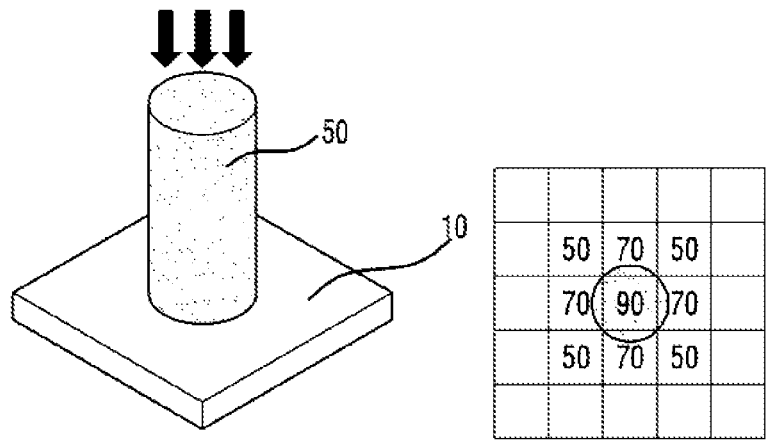
Figure 4A:
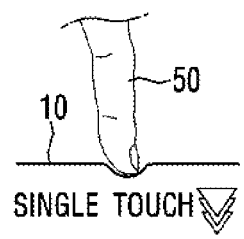
FIGS. 4a and 4b show a single touch and multiple touches respectively.
Figure 4B:
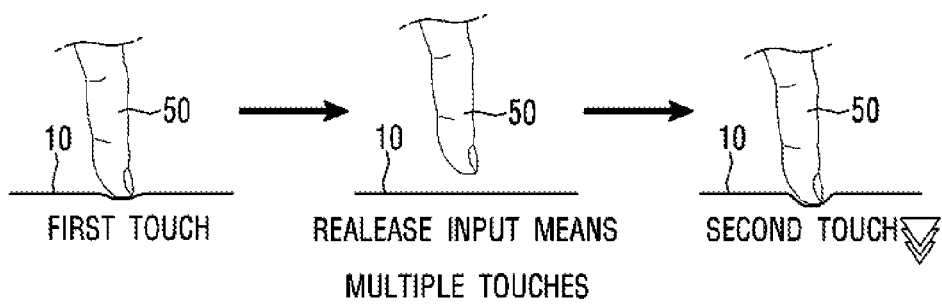

FIG. 1 is a view showing a terminal according to an embodiment of the present invention. FIGS. 2a and 2b are views for describing a capacitance change amount according to the size of a touch area. FIGS. 3a and 3b are views for describing the capacitance change amount according to the magnitude of a touch pressure. FIGS. 4a and 4b show a single touch and multiple touches respectively.

Referring to FIGS. 1 to 4, the terminal 1 according to the embodiment of the present invention includes the touch panel 10, a controller 20, and a processor 30.

When the surface of the touch panel 10 is touched by one or more input means 50, the terminal 1 analyzes the touch position by the input mean 50, the magnitude of the touch pressure and/or the size of the touch area by the input mean 50, and performs control for operations corresponding to the touch. Here, the input mean 50 can be a part of a human body or stylus pen.

Therefore, the user can manipulate the terminal 1 by touching the surface of the touch panel 10 with input mean 50.

The touch panel 10 can be a touch screen.

The processor 30 may detect the touch position (or coordinates), the magnitude of the touch pressure and/or the size of the touch area of the touch input to the touch panel 10.

The processor 30 may detect the touch position, the magnitude of the touch pressure and/or the size of the touch area of the touch by the input mean 50. Also, the processor 30 may store the quantified information in a storage mean 40 of the terminal 1 by quantifying the detected touch position, magnitude of the touch pressure and/or the size of the touch area.

Specifically, the processor 30 may calculate the size of the touch area according to the detected capacitance change amount. More specifically, the larger the touch area by the input mean 50, the larger the sum of the capacitance change amount. For example, as shown in FIG. 2a, when the area of the input mean 50 touching the touch panel 10 is "a", the sum of the capacitance change amounts is 90 (=50+10+10+10+10). Here, as shown in FIG. 2b, when the area of the object 50 touching the touch panel 10 becomes greater from "a" to "b" (b>a), the sum of the capacitance change amounts is increased to 310 (=50+45+45+45+45+20+20+20+20). In other words, the processor 30 may calculate the touch area using the capacitance change amount measured from the touch panel 10.

Also, the processor 30 may calculate the magnitude of the touch pressure according to the detected capacitance change amount. More specifically, the larger the magnitude of the touch pressure by the input mean 50, the larger the sum of the capacitance change amount. For example, as shown in FIG. 3a, when the object 50 touches the touch panel 10 without pressure (simple touch), the sum of the capacitance change amounts is 90 (=50+10+10+10+10). Also, as shown in FIG. 3b, when the object 50 touches the touch panel 10 at a predetermined pressure, the sum of the capacitance change amounts may be 570 (=90+70+70+70+70+50+50+50+50). Here, the touch area of the input mean 50 touching the touch panel 10 shown in FIGS. 3a and 3b is the same as "a", the touch area of the input mean 50 touching the touch panel 10. In other words, the processor 30 may calculate the magnitude of the touch pressure using the capacitance change amount.

The controller 20 may control the operation of the object using the touch position, the magnitude of the touch pressure and/or the size of the touch area transmitted from the processor 30.

The controller 20 may perform the first operation according to the magnitude of the touch pressure and/or the size of the touch area detected from the processor 30.

Specifically, the controller 20 may perform the operation corresponding to the magnitude of the touch pressure and/or the size of the touch area detected from the processor 30. For example, as the magnitude of the touch pressure and/or the size of the touch area detected from the processor 30 gets larger, the controller 20 may operate the object at the second state of the first operation. Also, the controller may operate the object at the first state again when the touch input to the touch panel 10 is released.

Also, the controller 20 may determine whether the touch input to the touch panel 10 is a single touch or multiple touches, and control the operation of the object using information about whether single touch or multiple touches, the touch position, the magnitude of the touch pressure and/or the size of the touch area transmitted from the processor 30.

Here, as shown in FIG. 4a, the single touch is one touch by the input mean 50 during the predetermined time period, and as shown in FIG. 4b, the multiple touches are at least two touches by the input mean 50 during the predetermined time period. Specifically, the multiple touches may include a first touch and a second touch. Here, the first touch may have a smaller touch pressure magnitude, a smaller touch area, or both a smaller touch pressure magnitude and a smaller touch area. Also, a time period for releasing the input means 50 from the touch panel 10 may be included between the first touch and the second touch.

When the single touch is determined, the controller 20 may operate the object with the first operation according to the magnitude of the touch pressure and/or the size of the touch area detected from the processor 30. On the other hand, when the multiple touches are determined, the controller 20 may operate the object with the second operation according to the magnitude of the touch pressure and/or the size of the touch area detected from the processor 30.

Also, the controller 20 may perform the operation according to the magnitude of the touch pressure and/or the size of the touch area detected from the processor 30. For example, when the touch input to the touch panel 10 is the single touch, and the magnitude of the touch pressure and/or the size of the touch area detected from the processor 30 becomes larger, the controller 20 may operate the object at the second state of the first operation. Also, the controller 20 may operate the object at the first state again when the touch input to the touch panel 10 is released.

When the touch input to the touch panel 10 are the multiple touches and the magnitude of the touch pressure and/or the size of the touch area detected from the processor 30 becomes larger, the controller 20 may operate the object at the second state of the second operation which is different from the first operation. Also, when touch input to the touch panel 10 is released, the controller may change back the state of the second operation from the second state to the first state.

This will be described in detail with reference to the embodiments below.

Figure 5:
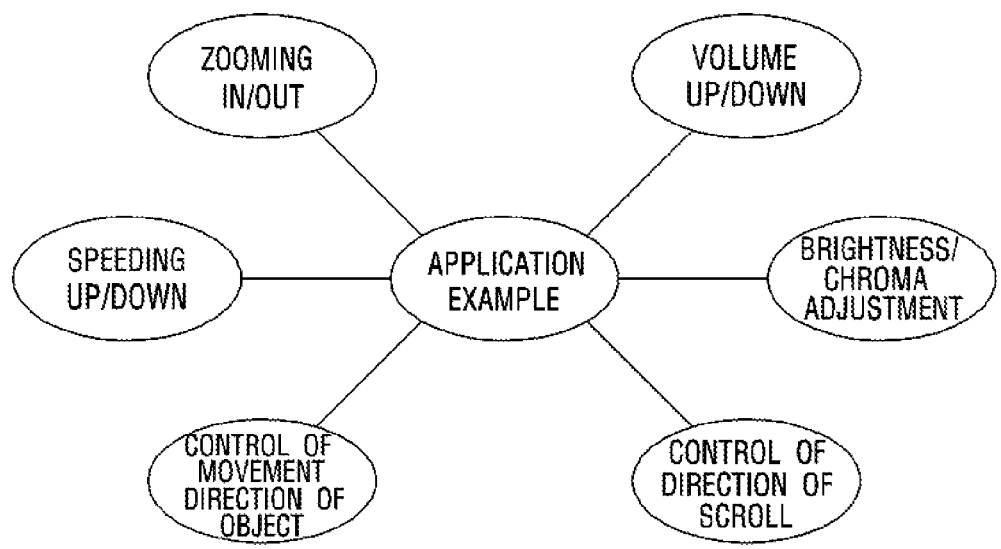
FIG. 5 is a view showing application examples of an operation control of an object.

FIG. 5 is a view showing application examples of the operation control of the object.

Referring to FIG. 5, the operation control of the object according to the embodiment of the present invention may include volume up/down, zooming in/out, speeding up/down, control of the movement direction of an object, control of the direction of a scroll, brightness adjustment, or chroma adjustment. Here, the second operation may be the reversing operation of the first operation.

Specifically, the second operation may be turning down the volume when the first operation is turning up the volume, the second operation may be zooming out the image when the first operation is zooming in the image, the second operation may be speeding down the playing speed when the first operation is speeding down the playing speed, the second operation may be upward move of the object when the first operation is downward move of the object, the second operation may be scrolling down when the first operation is scrolling up, the second operation may be darkening when the first operation is brightening, or the second operation may be thinning when the first operation is thickening.

The application examples will be described more specifically. Zooming in/out includes a case of magnifying or contracting a portion of or the whole of image displayed on the touch screen. For example, when a character is displayed on the touch screen, a portion of the character can be temporarily zoomed in or out at the desired zoom ratio. Also, a specific object displayed on the touch screen can be zoomed in/out. For example, only an image like a photograph displayed on the touch screen can be temporarily zoomed in/out, and a map displayed on the touch screen can be temporarily zoomed in/out.

Volume up/down includes a case of temporarily turning up or down the volume when a video file or an audio file is played in a device comprising the terminal 1.

Speeding up/down includes a case of temporarily speeding up or down the playing speed when a video file is played in a device comprising the terminal 1.

Control of the movement direction of the object includes a case of temporarily controlling the movement direction of an image displayed on the touch screen or the movement direction of an indication for selecting a specific object among a plurality of objects. For example, photograph images displayed on the touch screen may be moved forward or backward.

Control of the direction of a scroll includes a case of temporarily controlling the direction of the scroll when a scroll bar is displayed or not displayed. For example, the direction of the scroll can be temporarily controlled to upward, downward, left direction or right direction.

Brightness or chroma adjustment may refer the temporarily adjustment of the value of the brightness or the chroma.

Figure 6:
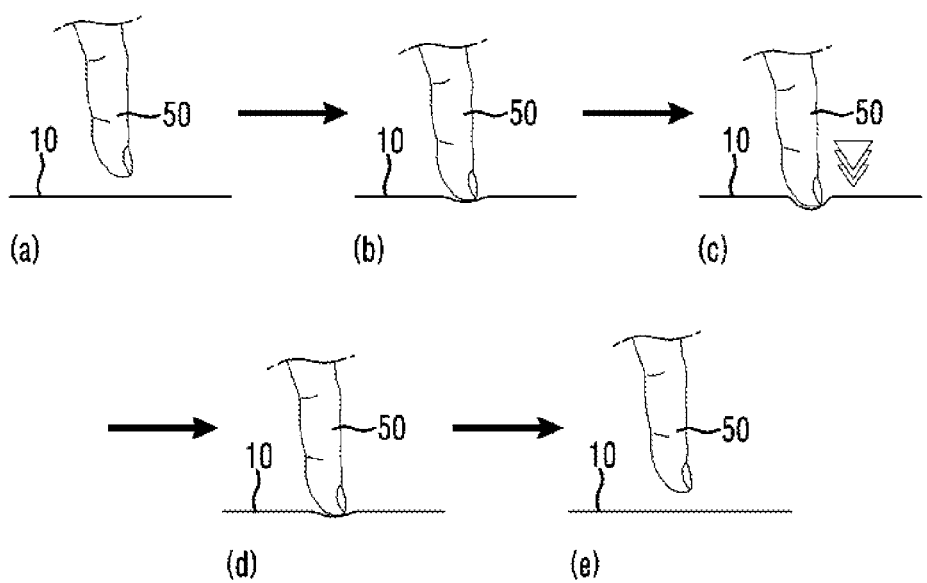
FIG. 6 shows a method for temporarily manipulating operation of object in accordance with touch pressure or touch area according to an embodiment of the present invention.

FIG. 6 shows a method for temporarily manipulating operation of object in accordance with touch pressure or touch area according to an embodiment of the present invention.

Referring to FIG. 6, a method for temporarily manipulating operation of object in accordance with touch pressure or touch area according to an embodiment of the present invention may includes touching and pressing the touch panel 10 by the input mean 50, and releasing the touch.

Figure 7A:
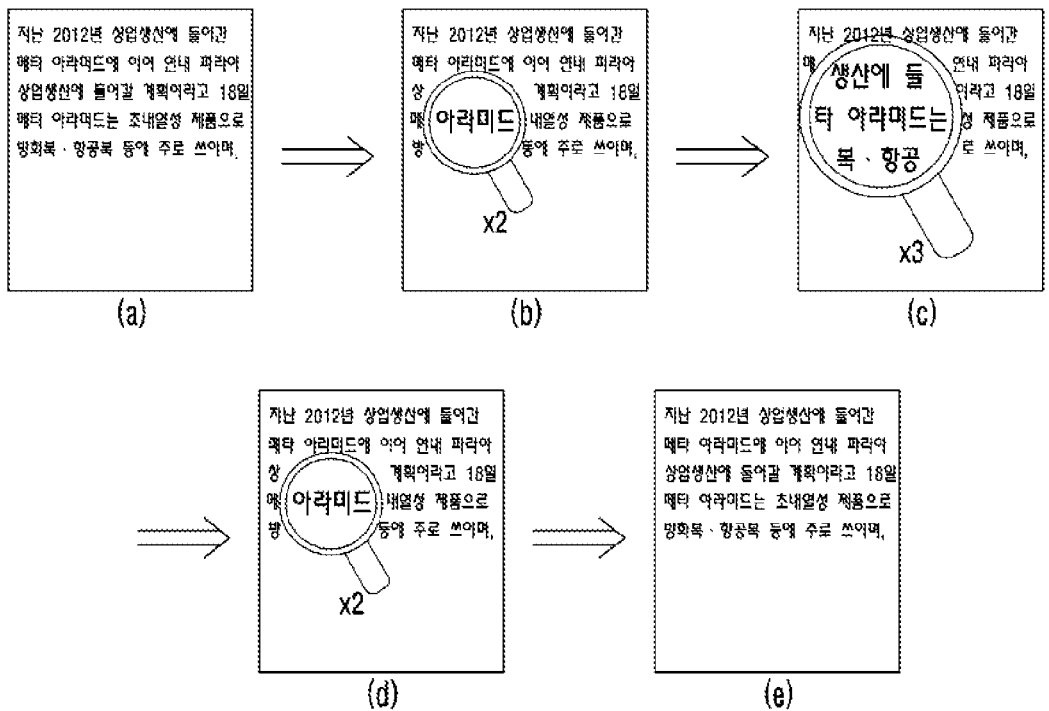
FIGS. 7a and 7b show an example of a first operation according to the operation shown in FIG. 6.
Figure 7B:
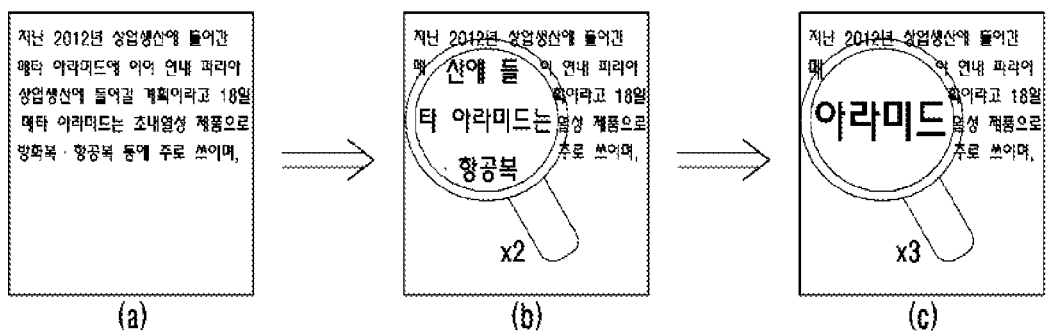
Figure 7B:
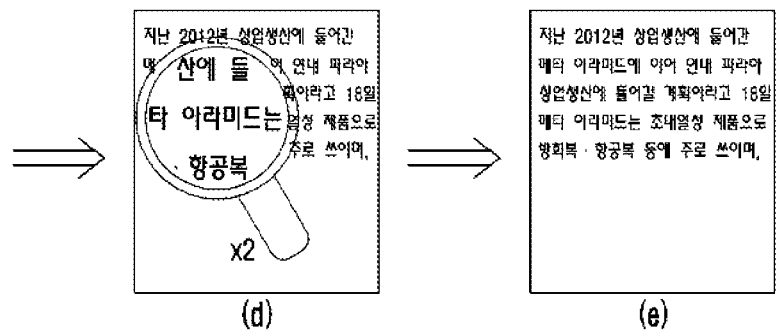

FIGS. 7a and 7b show an example of a first operation according to the method shown in FIG. 6.

Referring to FIGS. 7a and 7b, the first operation may includes zooming in the area the user wants to magnify from the first state to the second state, and zooming back from the second state to the first state. Here, the size of the magnifier or the zoom ratio can be changed according to the magnitude of the touch pressure and/or the size of the touch area. Here, the first operation may includes zooming out the area the user wants to contract from the first state to the second state, and zooming back from the second state to the first state, but the example that the second state is zoomed in state is described below.

Specifically, as shown in FIG. 7a, the image at the first state is displayed on the touch screen before the touch is input to the touch panel 10. When the touch is input to the touch panel 10, a magnifier is displayed on the image. If the input touch is the single touch, the size of the magnifier becomes larger as the magnitude of the touch pressure and/or the size of the touch area becomes larger while the zoom ratio of the character in the magnifier area maintained constant. After that, the size of the magnifier at the second state becomes smaller as the magnitude of the touch pressure and/or the size of the touch area becomes smaller. When the touch input to the touch panel 10 is completely released, the image at the first state is displayed again on the touch screen.

Also, as shown in FIG. 7b, the zoom ratio of the character in the magnifier area becomes larger as the magnitude of the touch pressure and/or the size of the touch area becomes larger while the size of the magnifier maintained constant. After that, the zoom ratio of the character at the second state becomes smaller as the magnitude of the touch pressure and/or the size of the touch area becomes smaller. When the touch input to the touch panel 10 is completely released, the image at the first state is displayed again on the touch screen.

Here, both the size of the magnifier and the zoom ratio of the character in the magnifier area may be simultaneously controlled together.

The faster the speed of the increasing the magnitude of the touch pressure and/or the size of the touch area is, the faster the speed of the increasing the size of the magnifier or the zoom ratio of the character in the magnifier area is. The faster the speed of the decreasing the magnitude of the touch pressure and/or the size of the touch area is, the faster the speed of the decreasing the size of the magnifier or the zoom ratio of the character in the magnifier area is.

Also, at the second state, the size of the magnifier or the zoom ratio of the character in the magnifier area may be adjusted to the desired value by adjusting the magnitude of the touch pressure and/or the size of the touch area of the touch input to the touch panel 10 at the second state.

Also, a desired area can be zoomed in by sliding the input mean 50 to the corresponding position at the second state.

Here, to avoid the magnifier is hidden by the input mean 50 such as a finger, the magnifier may be displayed at a position which is offset from the touch position by a predetermined distance.

Specifically, the offset between the center of the magnifier and the touch position may be changed according to the magnitude of the touch pressure and/or the size of the touch area. As shown in FIG. 7a, when the size of the magnifier becomes larger while the zoom ratio of the character in the magnifier area maintained constant, the offset between the center of the magnifier and the touch position may be changed according to the magnitude of the touch pressure and/or the size of the touch area. More specifically, when the magnitude of the touch pressure and/or the size of the touch area is increased, the offset between the center of the magnifier and the touch position is increased, and when the magnitude of the touch pressure and/or the size of the touch area is decreased, the offset between the center of the magnifier and the touch position is decreased, so that the boundary of the magnifier is always displayed close to the touch position.

Also, as shown in FIG. 7b, when the zoom ratio of the character in the magnifier area becomes larger while the size of the magnifier maintained constant, the offset between the center of the magnifier and the touch position may be set at a constant value. More specifically, the offset between the center of the magnifier and the touch position may be set as a value of the radius of the magnifier, so that the boundary of the magnifier is always displayed close to the touch position.

Here, the magnifier may be displayed at a position which is offset from the input mean 50 in a predetermined fixed direction regardless of the rotation of the touch panel 10. Specifically, the magnifier may be displayed at a position which is offset from the touch position in a user determined direction, for example upper direction from the finger, regardless of the rotation of the touch panel 10 by using a sensor like gyroscope or gravity sensor. Therefore, although the touch panel 10 is rotated, the magnifier is not hidden by the input mean 50 such as a finger, and always displayed at a position which is offset from the touch position in a fixed direction.

Figure 8:
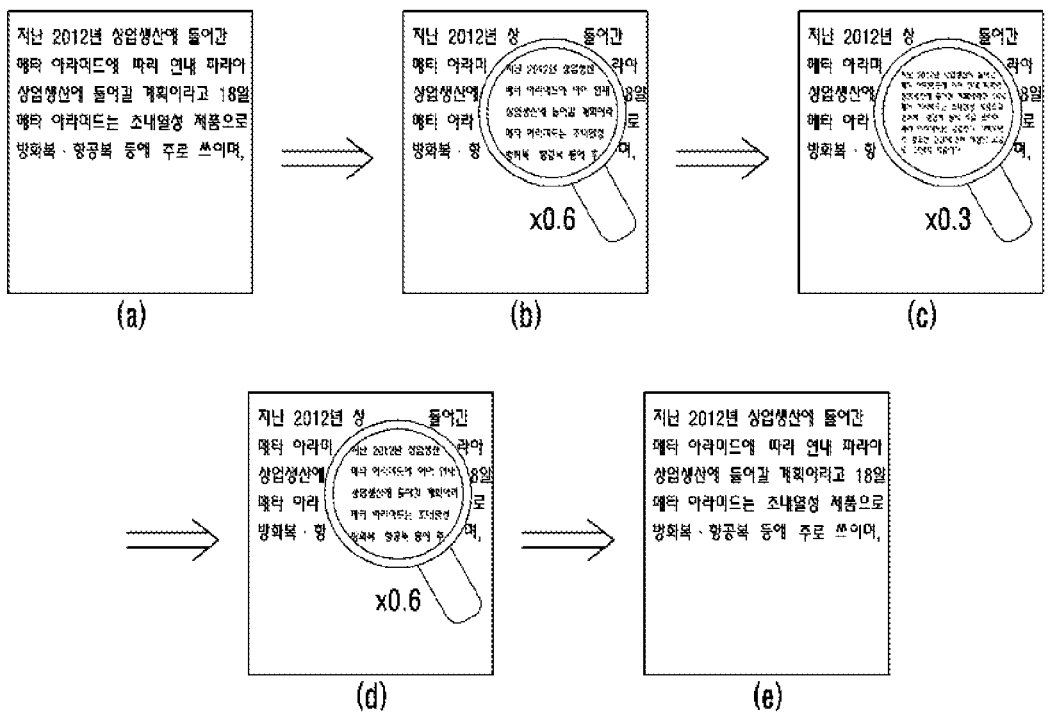
FIG. 8 shows an example of a second operation according to the operation shown in FIG. 6.

FIG. 8 shows an example of a second operation according to the method shown in FIG. 6.

Here, the second operation is the zooming out an image, which is the reversing operation of the first operation.

Referring to FIG. 8, the second operation may includes zooming out the area the user wants to contract from the first state to the second state, and zooming back from the second state to the first state. Here, the size of the magnifier or the zoom ratio can be changed according to the magnitude of the touch pressure and/or the size of the touch area.

Specifically, as shown in FIG. 8, the image at the first state is displayed on the touch screen before the touch is input to the touch panel 10. When the touch is input to the touch panel 10, a magnifier is displayed on the image. If the input touch is the multiple touches, the zoom ratio of the character in the magnifier area becomes smaller as the magnitude of the touch pressure and/or the size of the touch area becomes larger while the size of the magnifier maintained constant. After that, the zoom ratio of the character at the second state becomes larger as the magnitude of the touch pressure and/or the size of the touch area becomes smaller. When the touch input to the touch panel 10 is completely released, the image at the first state is displayed again on the touch screen.

Such a method allows a user to be able to temporarily zoom in/out a portion of the touch screen which is the area the user wants to zoom in/out at the desired zoom ratio and display the image at the original state on the touch screen again by releasing the input touch after reviewing the zoomed in or zoomed out area.

Figure 9:
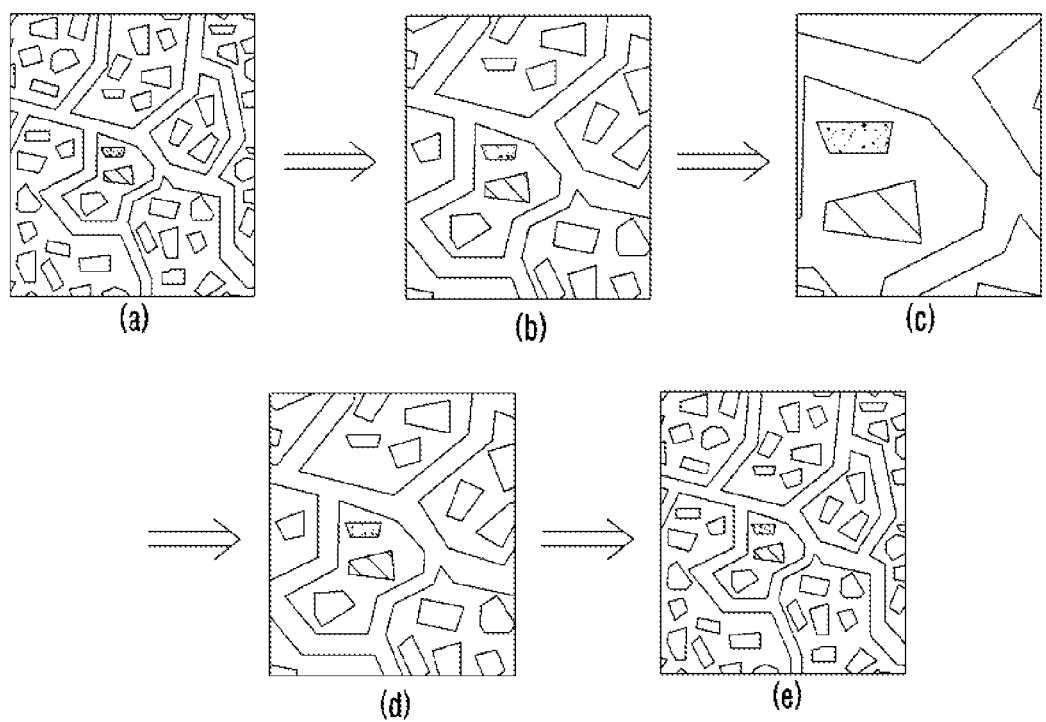
FIG. 9 shows another example of the first operation according to the operation shown in FIG. 6.
Figure 10:
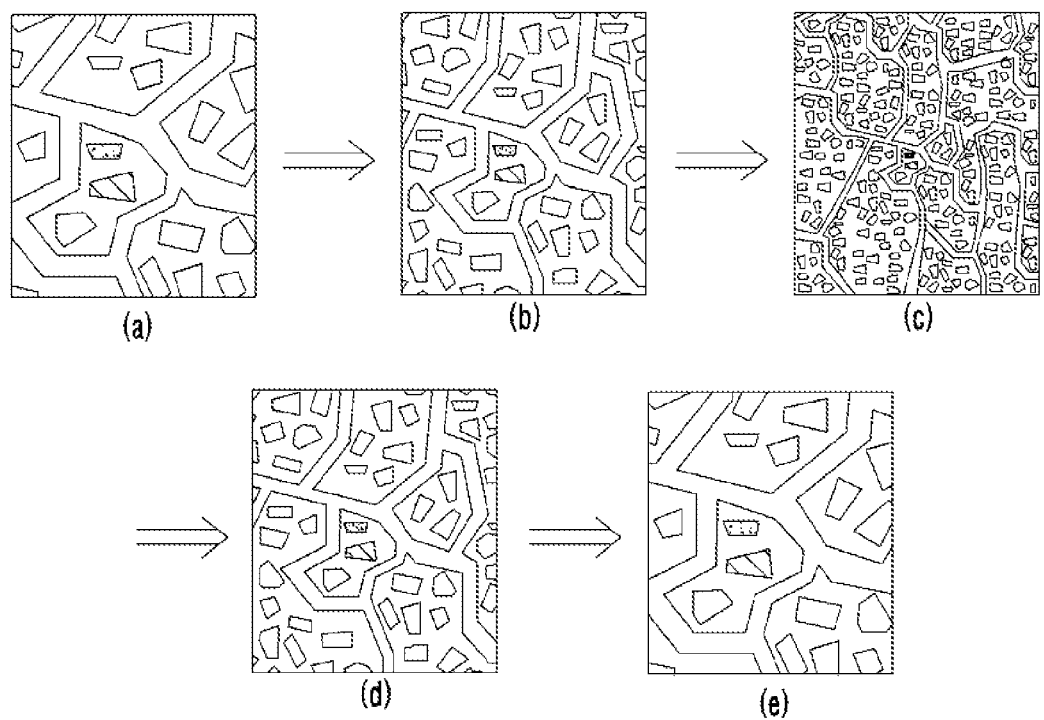
FIG. 10 shows another example of the second operation according to the operation shown in FIG. 6.

FIG. 9 shows another example of the first operation according to the method shown in FIG. 6, and FIG. 10 shows another example of the second operation according to the method shown in FIG. 6. Here, a description of the FIGS. 9 and 10 is similar to the description of FIGS. 7*a*, 7*b*, and 8. Therefore, the difference between FIGS. 9 and 10 and FIGS. 7*a*, 7*b*, and 8 will be described.

Referring to the FIGS. 9 and 10, the first operation may includes zooming in a map the user wants to magnify from the first state to the second state, and zooming back from the second state to the first state, and the second operation may includes zooming out a map the user wants to contract from the first state to the second state, and zooming back from the second state to the first state.

Specifically, as shown in FIG. 9, the map at the first state is displayed on the touch screen before the touch is input to the touch panel 10. When the touch is input to the touch panel 10, the map including the zoom ratio of the map becomes the second state which is larger than the first state as the magnitude of the touch pressure and/or the size of the touch area becomes larger if the input touch is a single touch. After that, the zoom ratio of the map at the second state becomes smaller as the magnitude of the touch pressure and/or the size of the touch area becomes smaller. When the touch input to the touch panel 10 is completely released, the map at the first state is displayed again on the touch screen.

Specifically, as shown in FIG. 10, the map at the first state is displayed on the touch screen before the touch is input to the touch panel 10. When the touch is input to the touch panel 10, the zoom ratio of the map becomes the second state which is smaller than the first state as the magnitude of the touch pressure and/or the size of the touch area becomes larger if the input touches are multiple touches. After that, the zoom ratio of the map at the second state becomes larger as the magnitude of the touch pressure and/or the size of the touch area becomes smaller. When the touch input to the touch panel 10 is completely released, the map at the first state is displayed again on the touch screen.

Here, the description of adjustment of the speed of the changing the zoom ratio of the map is same as the description of the FIGS. 7*a* and 7*b*.

Also, at the second state, the zoom ratio of the map may be adjusted to the desired value by adjusting the magnitude of the touch pressure and/or the size of the touch area of the touch input to the touch panel 10 at the second state.

Here, the center of the zooming may be the touch position or may be the center of the touch screen regardless of the touch position.

Such a method allows a user to able to temporarily zoom in/out a map the user wants to zoom in/out at the desired zoom ratio and make the map at the original state be displayed on the touch screen again after reviewing the zoomed in or zoomed out map and releasing the input touch.

Also, the method described above can be applied to other object (volume, playing speed, movement direction of an object, direction of a scroll, or brightness/chroma) in the same manner.

A method for temporarily manipulating operation of object in accordance with touch pressure or touch area according to an embodiment of the present invention will be described below.

Figure 11:
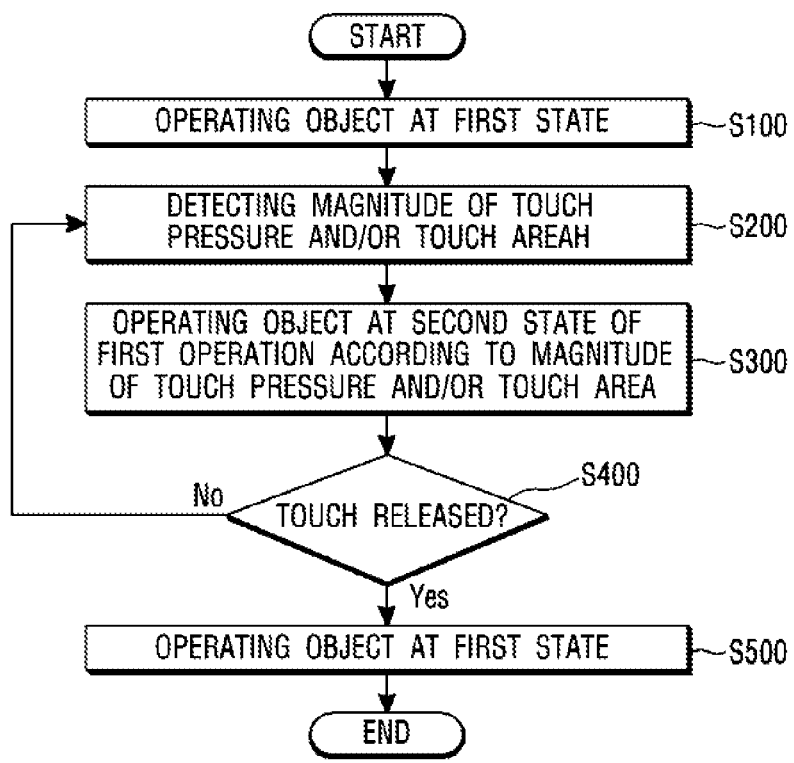
FIG. 11 is a flowchart for describing a method for temporarily manipulating operation of object in accordance with touch pressure or touch area according to an embodiment of the present invention.

FIG. 11 is a flowchart for describing a method for temporarily manipulating operation of object in accordance with touch pressure or touch area according to an embodiment of the present invention.

Referring to FIGS. 1 and 11, the object is operated at the first state (S100). For example, as shown in FIG. 7*a*, the image at the first state is displayed on the touch screen before the touch is input to the touch panel 10.

The magnitude of the touch pressure and/or the size of the touch area is detected (S200). When the touch input to the touch panel 10, the processor 30 may calculate the magnitude of the touch pressure and/or the size of the touch area according to the detected capacitance change amount.

The object is operated at the second state of the first operation according to the detected magnitude of the touch pressure and/or the size of the touch area (S300). For example, as shown in FIG. 7*a*, the magnifier of which the size becomes larger as the magnitude of the touch pressure and/or the size of the touch area becomes larger is displayed on the image. Here, at the second state, the second state can be adjusted by adjusting the magnitude of the touch pressure and/or the size of the touch area of the touch input to the touch panel 10.

Whether or not the input touch is released is checked (S400). If the input touch is not released, the method returns to the step S200. For example, as shown in FIG. 7*a*, the size of the magnifier at the second state becomes smaller as the magnitude of the touch pressure and/or the size of the touch area becomes smaller.

If the input touch is released, the object is operated at the first state (S500). For example, as shown in FIG. 7*a*, when the touch input to the touch panel 10 is completely released, the image at the first state is displayed again on the touch screen.

Figure 12:
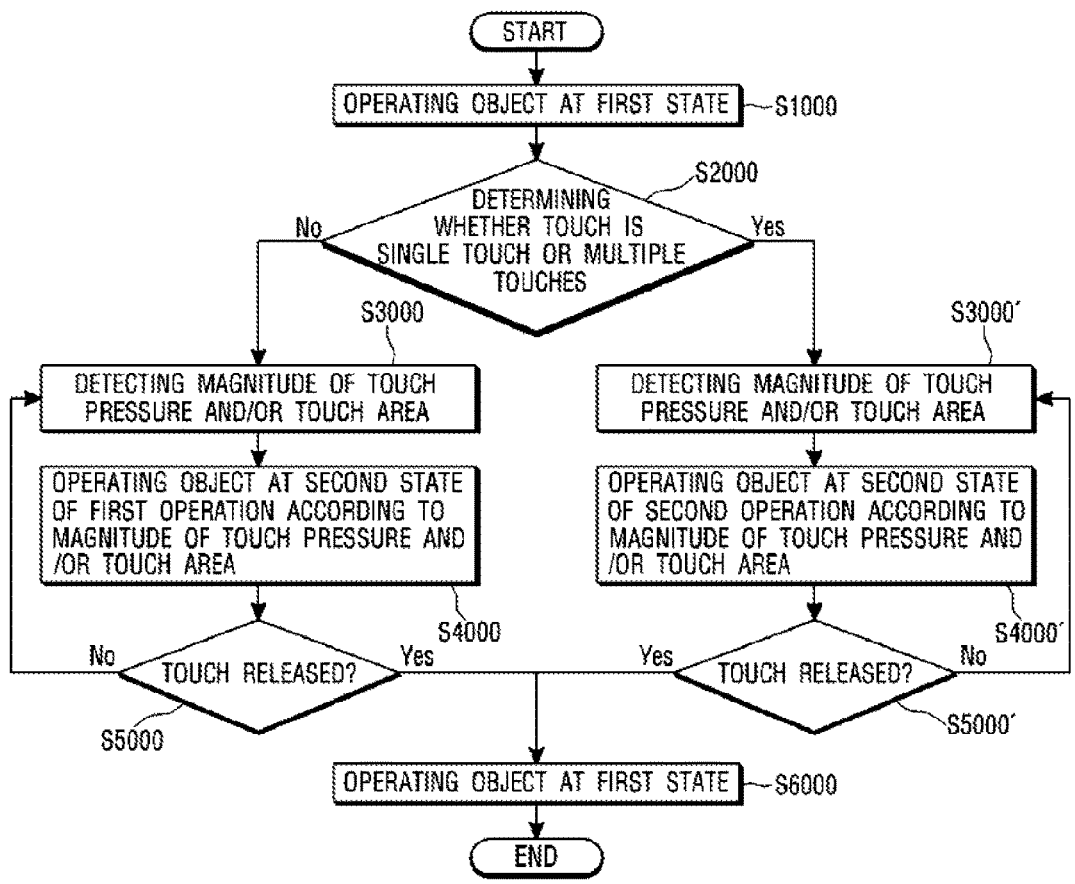
FIG. 12 is a flowchart for describing a method for temporarily manipulating operation of object in accordance with touch pressure or touch area according to another embodiment of the present invention.

FIG. 12 is a flowchart for describing a method for temporarily manipulating operation of object in accordance with touch pressure or touch area according to another embodiment of the present invention.

Referring to FIGS. 1 and 12, the object is operated at the first state (S1000). For example, as shown in FIG. 7*b*, the image at the first state is displayed on the touch screen before the touch is input to the touch panel 10.

Whether the input touch is a single touch or multiple touches is determined (S2000). When the touch is input to the touch panel 10, the controller 20 determines whether the touch input to the touch panel 10 is a single touch or multiple touches.

If the input touch is a single touch, the magnitude of the touch pressure and/or the size of the touch area is detected (S3000). When the touch input to the touch panel 10, the processor 30 may calculate the magnitude of the touch pressure and/or the size of the touch area according to the detected capacitance change amount.

The object is operated at the second state of the first operation according to the detected magnitude of the touch pressure and/or the size of the touch area (S4000). For example, as shown in FIG. 7*b*, the magnifier of which the zoom ratio becomes larger as the magnitude of the touch pressure and/or the size of the touch area becomes larger is displayed on the image. Here, at the second state, the second state can be adjusted by adjusting the magnitude of the touch pressure and/or the size of the touch area of the touch input to the touch panel 10.

Whether or not the input touch is released is checked (S5000). If the input touch is not released, the method returns to the step S3000. For example, as shown in FIG. 7*b*, the zoom ratio of the character at the second state becomes smaller as the magnitude of the touch pressure and/or the size of the touch area becomes smaller.

If the input touches are multiple touches, the magnitude of the touch pressure and/or the size of the touch area is detected (S3000'). When the touch input to the touch panel 10, the processor 30 may calculate the magnitude of the touch pressure and/or the size of the touch area according to the detected capacitance change amount.

The object is operated at the second state of the second operation which is different from the first operation according to the detected magnitude of the touch pressure and/or the size of the touch area (S4000'). For example, as shown in FIG. 8, the magnifier of which the zoom ratio becomes smaller as the magnitude of the touch pressure and/or the size of the touch area becomes larger is displayed on the image. Here, at the second state, the second state can be adjusted by adjusting the magnitude of the touch pressure and/or the size of the touch area of the touch input to the touch panel 10.

Whether or not the input touch is released is checked (S5000'). If the input touch is not released, the method returns to the step S3000'. For example, as shown in FIG. 8, the zoom ratio of the character at the second state becomes larger as the magnitude of the touch pressure and/or the size of the touch area becomes smaller.

If the input touch is released, the object is operated at the first state (S6000). For example, as shown in FIG. 7b or FIG. 8, when the touch input to the touch panel 10 is completely released, the image at the first state is displayed again on the touch screen.

If a plurality of objects is displayed simultaneously, the controller 20 may distinguish between the objects according to the touch positions. Such a distinction may be performed before or after determining whether the input touch is a single touch or multiple touches.

In the foregoing, when the state of the operation of the object is changed in accordance with the touch area, it is possible to temporarily manipulate the operation of the object according to the embodiment even without a hardware device capable of detecting the touch pressure. Meanwhile, when the state of the operation of the object is changed according to the magnitude of the touch pressure, there is an advantage of linearly controlling the magnitude of the touch pressure. Also, it is relatively easy for the user to control the magnitude of the pressure of the touch input to the touch screen in order to change the state of the operation of the object to the state that the user wants. Furthermore, even when an object like a conductive rod is used, the magnitude of the touch pressure can be easily controlled.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A method for temporarily manipulating an operation of an object in accordance with a touch pressure or a touch area, the method comprising:
   displaying an image on a touch screen;
   receiving a touch that is input to the touch screen;
   displaying a magnifier on the image when receiving the touch;
   detecting at least one of a magnitude of the touch pressure and a size of the touch area;
   displaying an object in the magnifier proximate to the touch that is zoomed in;
   adjusting an extent to which a portion of the object is zoomed in based on at least one of the magnitude of the touch pressure and the size of the touch area; and
   setting an offset between a center of the magnifier and the touch position at a constant value when the object in the magnifier proximate to the touch is zoomed in and size of the magnifier is maintained constant;
   wherein the offset between the center of the magnifier and the touch position is set as a value of a radius of the magnifier;
   wherein the magnifier is displayed at a position on the touch screen with the offset between the center of the magnifier and the touch position in a predetermined fixed direction regardless of a rotation of the touch screen.

2. The method of claim 1, wherein the detecting at least one of the magnitude of the touch pressure and the size of the touch area comprises calculating at least one of the magnitude of the touch pressure and the size of the touch area according to a capacitance change amount caused by the touch.

3. A terminal comprising:
   a touch screen configured to display an image;
   a processor configured to:
      receive a touch that is input to the touch screen;
      display a magnifier on the image when receiving the touch;
      detect at least one of a magnitude of the touch pressure and a size of the touch area;
      display an object in the magnifier proximate to the touch that is zoomed in;
      adjust an extent to which a portion of the object is zoomed in based on at least one of the magnitude of the touch pressure and the size of the touch area; and
      set an offset between a center of the magnifier and the touch position at a constant value when the object in the magnifier proximate to the touch is zoomed in and size of the magnifier is maintained constant;
      wherein the offset between the center of the magnifier and the touch position is set as a value of radius of the magnifier;
      wherein the magnifier is displayed at a position on the touch screen with the offset between the center of the magnifier and the touch position in a predetermined fixed direction regardless of a rotation of the touch screen.

* * * * *